United States Patent
Goh

(10) Patent No.: US 10,007,869 B2
(45) Date of Patent: *Jun. 26, 2018

(54) PAYMENT CARD RECEIVER WITH SELECTABLY BLOCKABLE SLOT

(71) Applicant: VeriFone, Inc., San Jose, CA (US)

(72) Inventor: James Kei Choong Goh, Singapore (SG)

(73) Assignee: VeriFone, Inc., San Jose, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/671,849

(22) Filed: Aug. 8, 2017

(65) Prior Publication Data

US 2017/0337451 A1  Nov. 23, 2017

Related U.S. Application Data

(63) Continuation of application No. 14/834,084, filed on Aug. 24, 2015, now Pat. No. 9,747,530.

(51) Int. Cl.
*G06K 13/08* (2006.01)

(52) U.S. Cl.
CPC ................ *G06K 13/0875* (2013.01)

(58) Field of Classification Search
CPC .................................... G06K 13/0875
See application file for complete search history.

(56) References Cited

U.S. PATENT DOCUMENTS

| | | | |
|---|---|---|---|
| 4,609,957 A | 9/1986 | Gentet et al. | |
| 5,850,079 A | 12/1998 | Ohwa et al. | |
| 5,929,427 A * | 7/1999 | Harada | G06K 7/0013 235/486 |
| 5,984,184 A | 11/1999 | Kojima | |
| 6,491,216 B1 | 12/2002 | May | |
| 6,491,219 B2 | 12/2002 | Brentini | |
| 6,983,882 B2 | 1/2006 | Cassone | |
| 7,946,477 B1 | 5/2011 | Ramachandran et al. | |
| 8,025,219 B2 | 9/2011 | Henry | |
| 8,146,801 B1 | 4/2012 | Crews et al. | |

(Continued)

FOREIGN PATENT DOCUMENTS

| | | |
|---|---|---|
| EP | 0959424 | 11/1999 |
| EP | 1037446 | 9/2000 |

(Continued)

OTHER PUBLICATIONS

Search Report issued in corresponding International Application No. PCT/US16/45800, dated Sep. 16, 2016.

(Continued)

*Primary Examiner* — Christle I Marshall
(74) *Attorney, Agent, or Firm* — Hunton Andrews Kurth LLP

(57) ABSTRACT

A payment card receiver including at least one element defining a payment card receiving slot, a shutter, pivotably mounted with respect to the payment card receiving slot for selectably blocking the payment card receiving slot and a card-operated shutter movement restricting switch operative to retain the shutter in a shutter movement restricting operative orientation, in which the shutter blocks the payment card receiving slot, in the absence of at least partial insertion of a payment card in the payment card receiving slot.

16 Claims, 35 Drawing Sheets

(56) References Cited

U.S. PATENT DOCUMENTS

| | | | |
|---|---|---|---|
| 8,146,802 | B1 | 4/2012 | Ramachandran et al. |
| 8,191,767 | B1 | 6/2012 | Ramachandran et al. |
| 8,333,521 | B2 * | 12/2012 | Viglione ............... G03B 9/22 348/363 |
| 8,474,700 | B1 | 7/2013 | Lewis et al. |
| 9,038,891 | B2 * | 5/2015 | Lewis ............... G07F 19/201 235/379 |
| 9,747,530 | B2 * | 8/2017 | Goh ............... G06K 13/0875 |
| 2001/0011680 | A1 | 8/2001 | Soltesz et al. |
| 2002/0117550 | A1 | 8/2002 | Hirasawa |
| 2004/0007629 | A1 | 1/2004 | Leda |
| 2004/0188519 | A1 | 9/2004 | Cassone |
| 2006/0157567 | A1 | 7/2006 | Baumann et al. |
| 2008/0011850 | A1 | 1/2008 | Henry |
| 2011/0006118 | A1 | 1/2011 | Mizawa |
| 2012/0080518 | A1 | 4/2012 | Van Den Bogart et al. |
| 2013/0119136 | A1 * | 5/2013 | Ishikawa ............ G07F 19/2055 235/449 |
| 2014/0217169 | A1 * | 8/2014 | Lewis ............... G07F 19/201 235/379 |
| 2017/0061259 | A1 * | 3/2017 | Goh ............... G06K 13/0875 |

FOREIGN PATENT DOCUMENTS

| | | |
|---|---|---|
| EP | 1457919 | 9/2004 |
| JP | 1083529 | 3/1998 |

OTHER PUBLICATIONS

Written Opinion issued in corresponding International Application No. PCT/US16/45800, dated Sep. 16, 2016.
Notice of Allowance dated Jul. 20, 2016 issued in corresponding U.S. Appl. No. 14/580,995.
Office Action dated Apr. 14, 2016 issued in corresponding U.S. Appl. No. 14/580,995.
U.S. Appl. No. 60/994,742, filed Sep. 20, 2007.
U.S. Appl. No. 60/879,991, filed Jan. 11, 2007.
U.S. Appl. No. 60/837,743, filed Aug. 14, 2006.
U.S. Appl. No. 60/819,126, filed Jul. 6, 2006.
U.S. Appl. No. 60/819,127, filed Jul. 6, 2006.
U.S. Appl. No. 60/752,188, filed Dec. 20, 2005.
U.S. Appl. No. 61/067,660, filed Feb. 29, 2008.
U.S. Appl. No. 60/994,680, filed Sep. 20, 2007.
U.S. Appl. No. 61/446,744, filed Feb. 25, 2011.
U.S. Appl. No. 61/574,594, filed Aug. 5, 2011.
U.S. Appl. No. 61/628,513, filed Nov. 1, 2011.
U.S. Appl. No. 61/629,900, filed Nov. 30, 2011.
U.S. Appl. No. 60/918,153, filed Mar. 16, 2007.
U.S. Appl. No. 60/918,455, filed Mar. 16, 2007.
U.S. Appl. No. 60/918,458, filed Mar. 16, 2007.
U.S. Appl. No. 61/463,313, filed Oct. 27, 2010.
U.S. Appl. No. 61/354,778, filed Jun. 15, 2010.

* cited by examiner

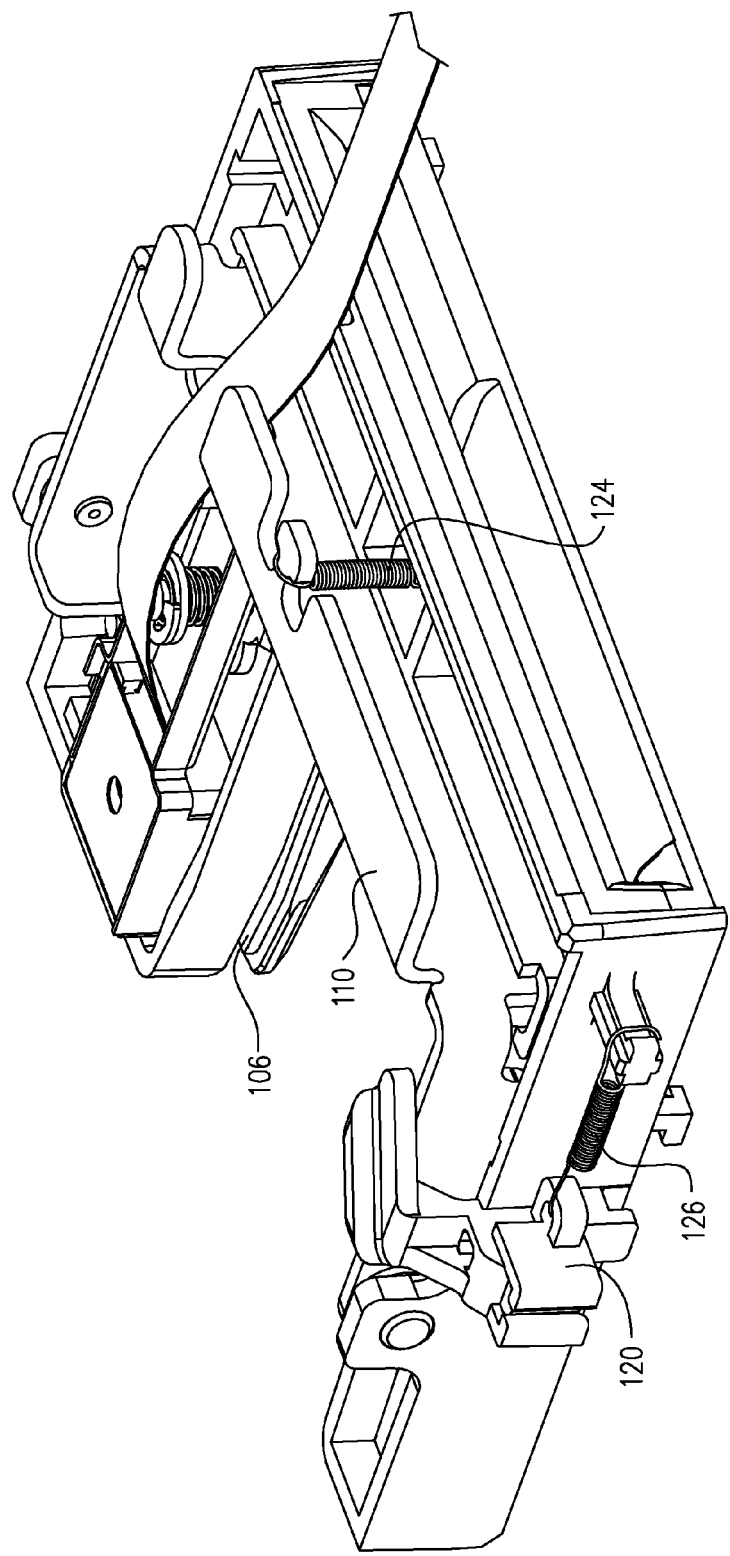

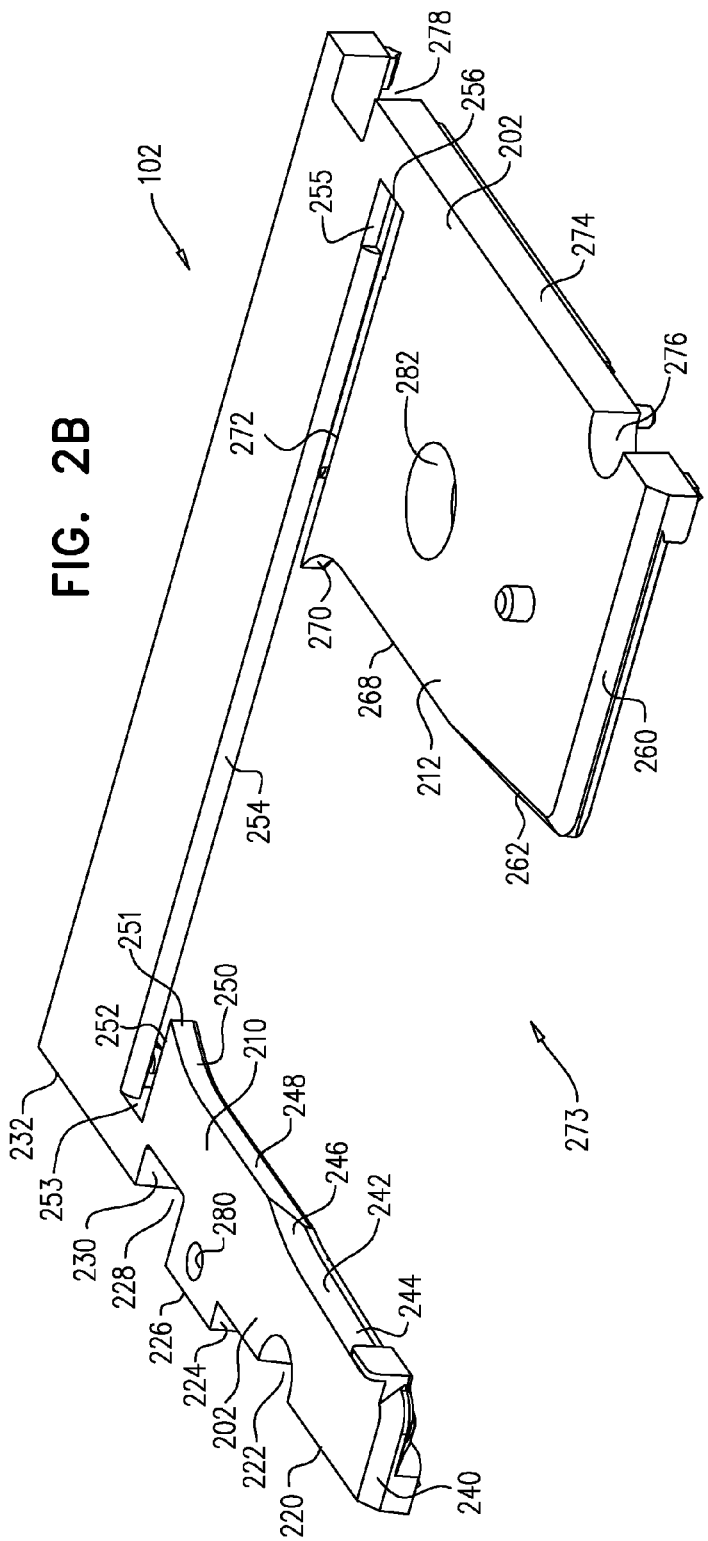

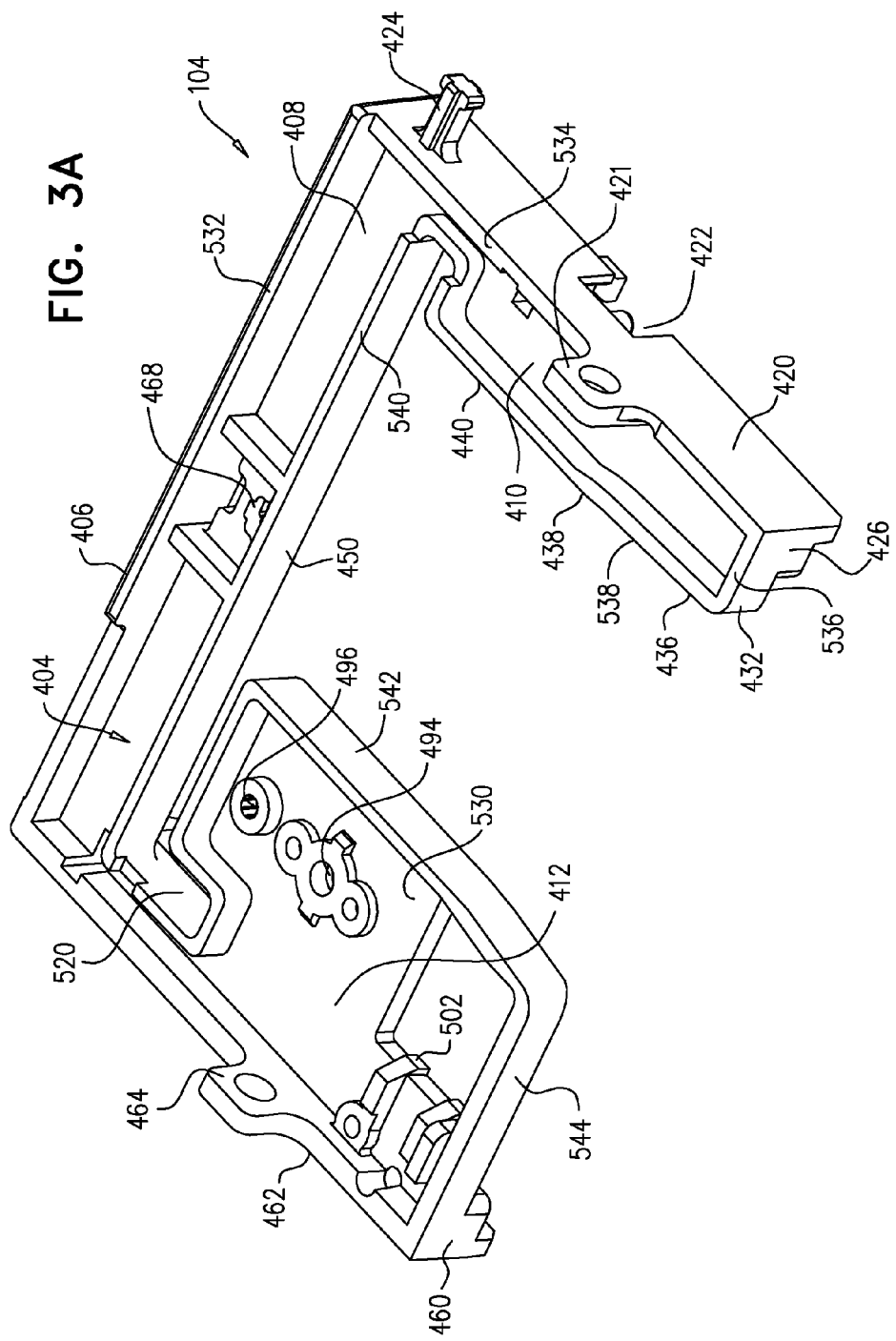

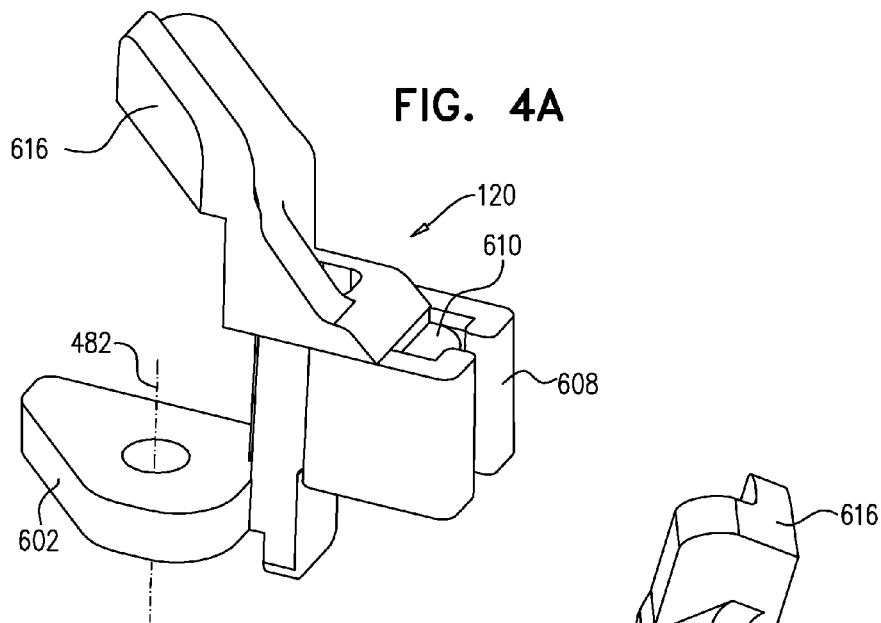
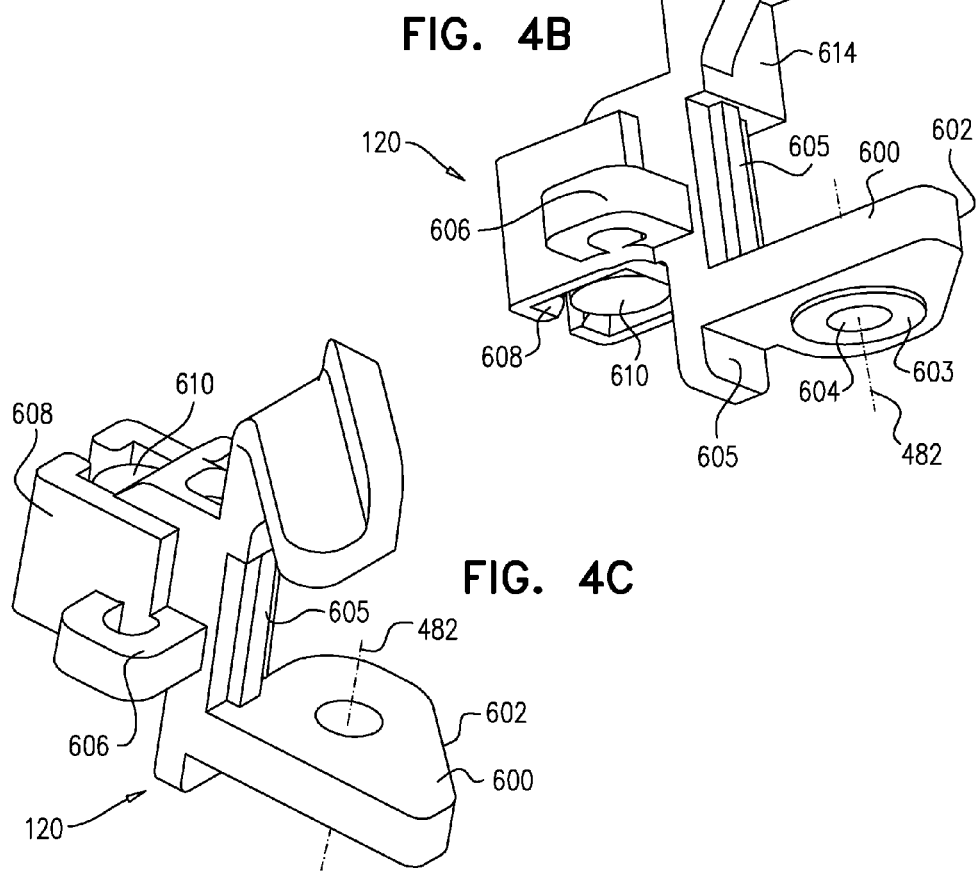

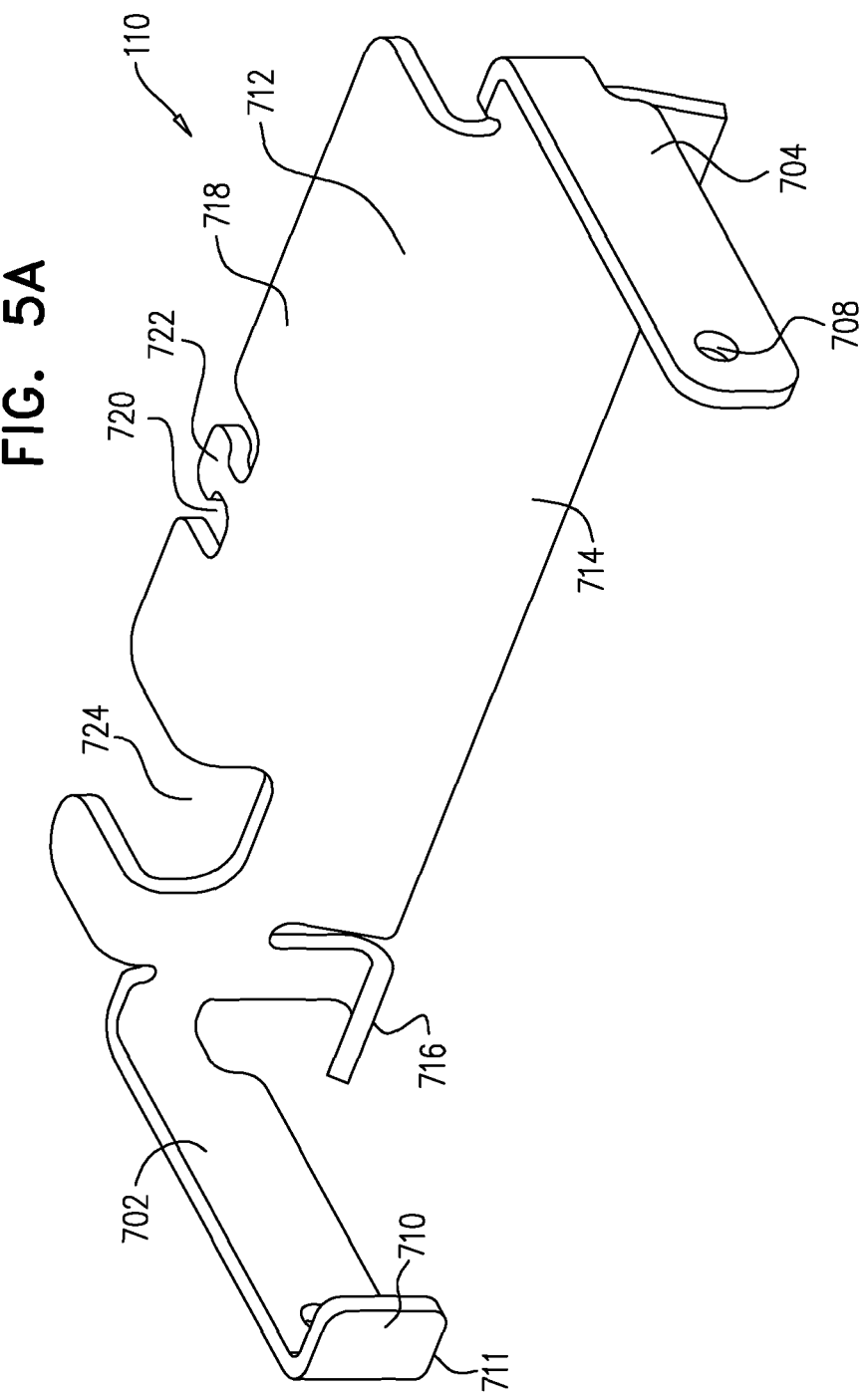

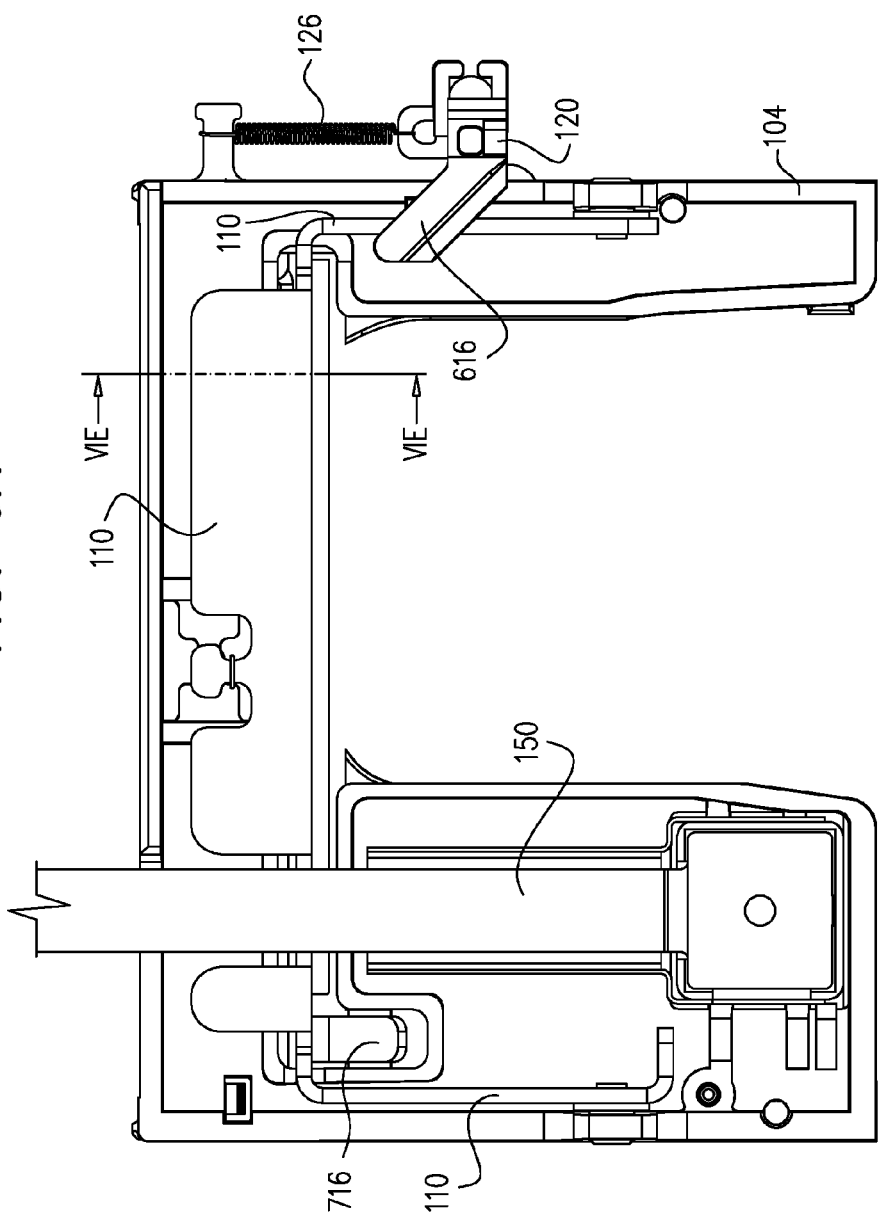

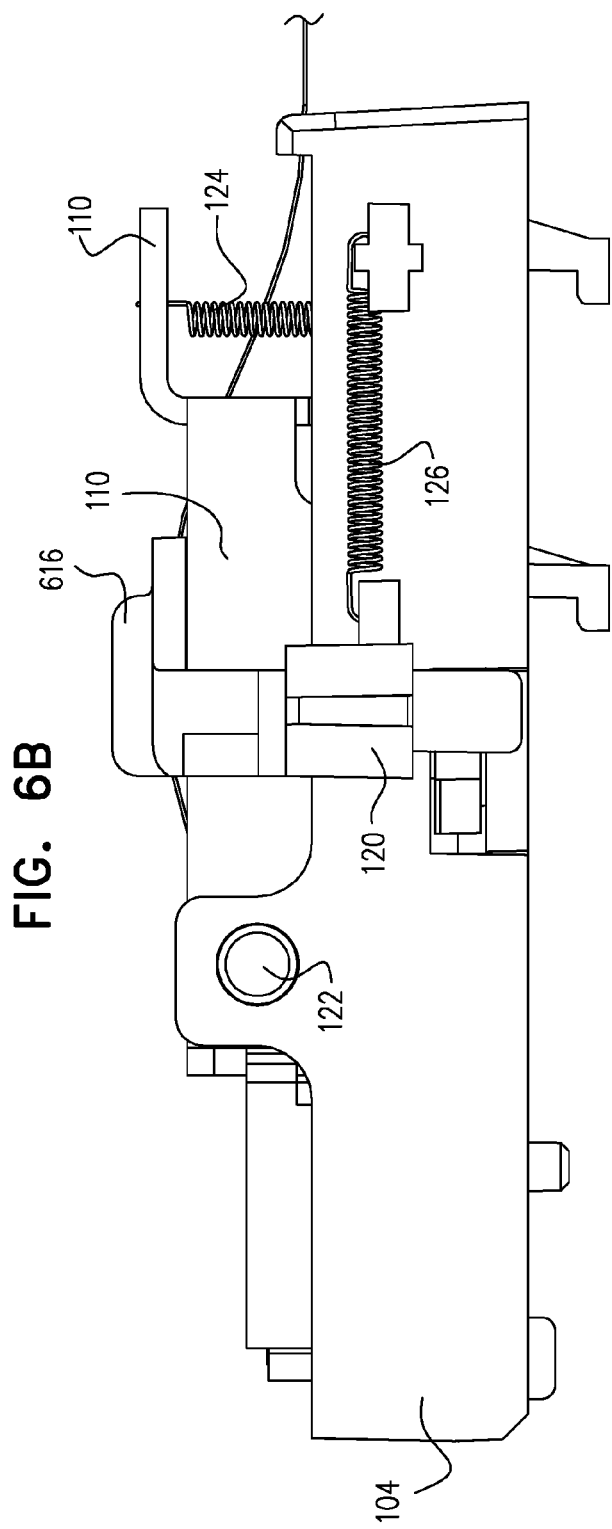

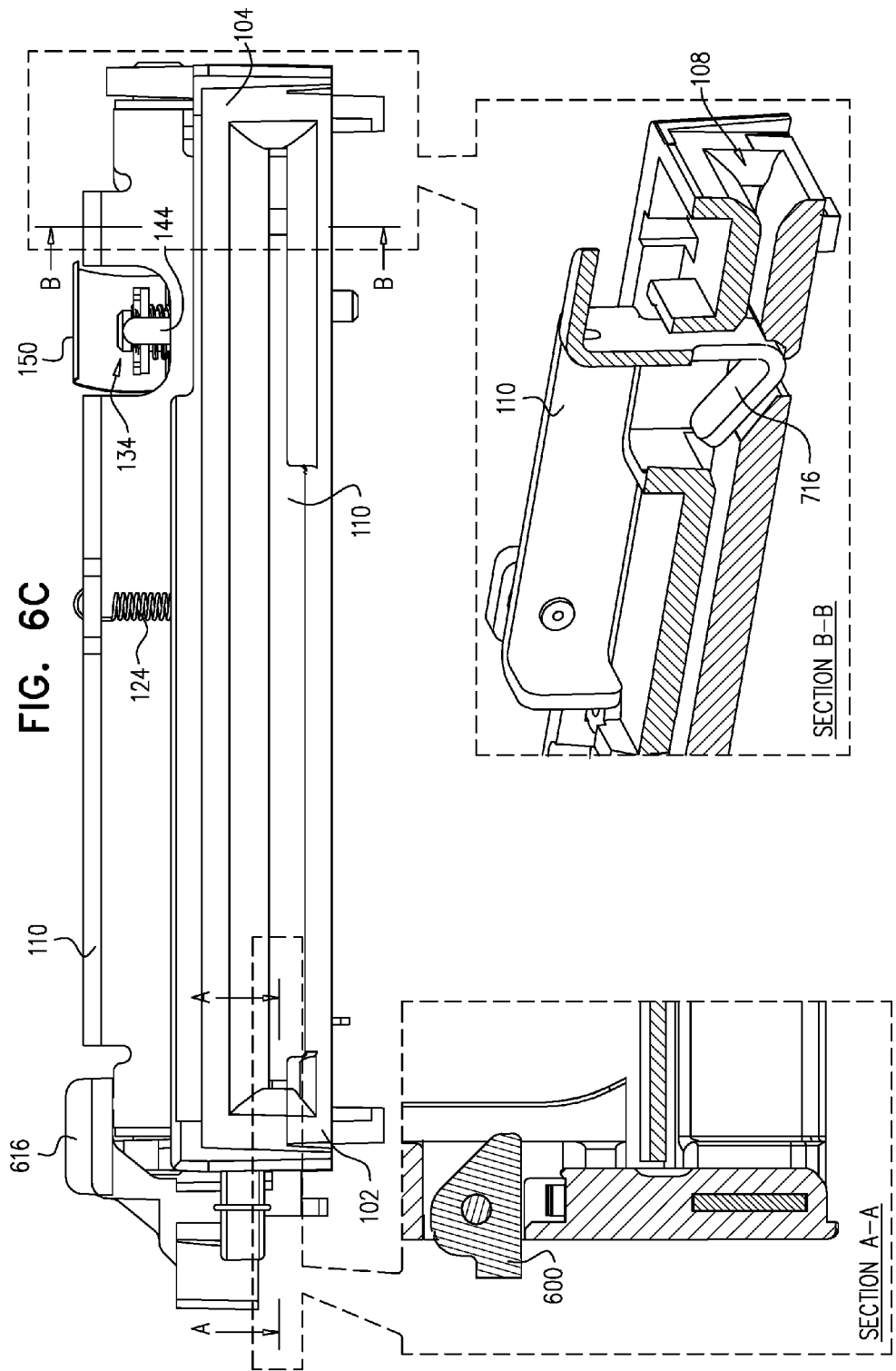

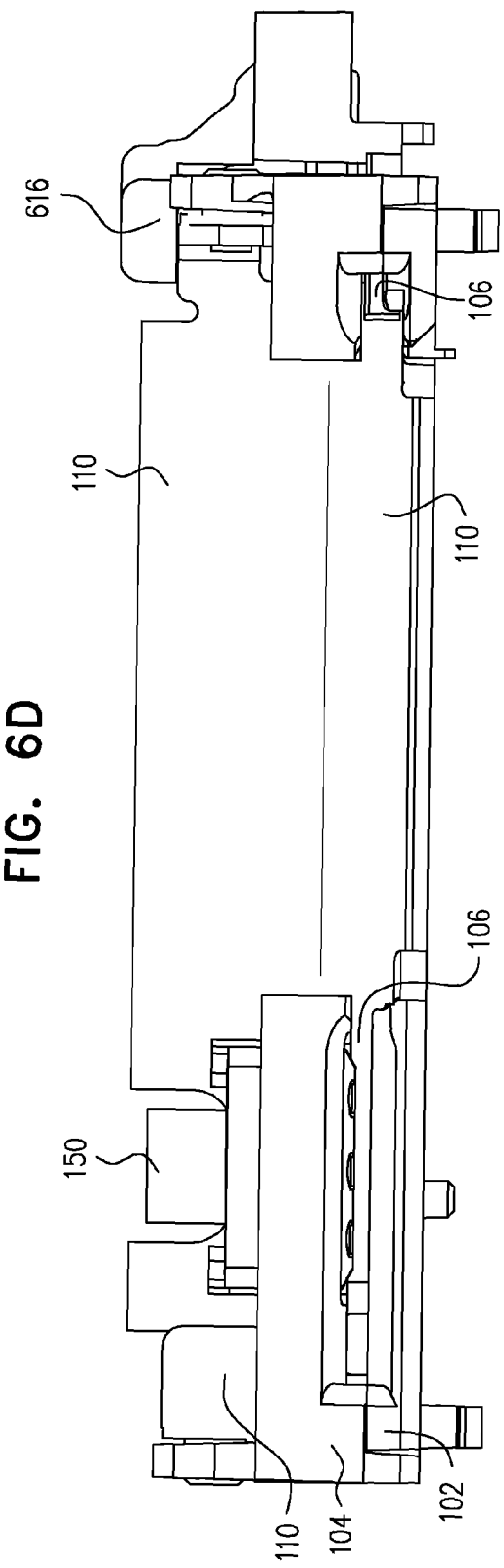

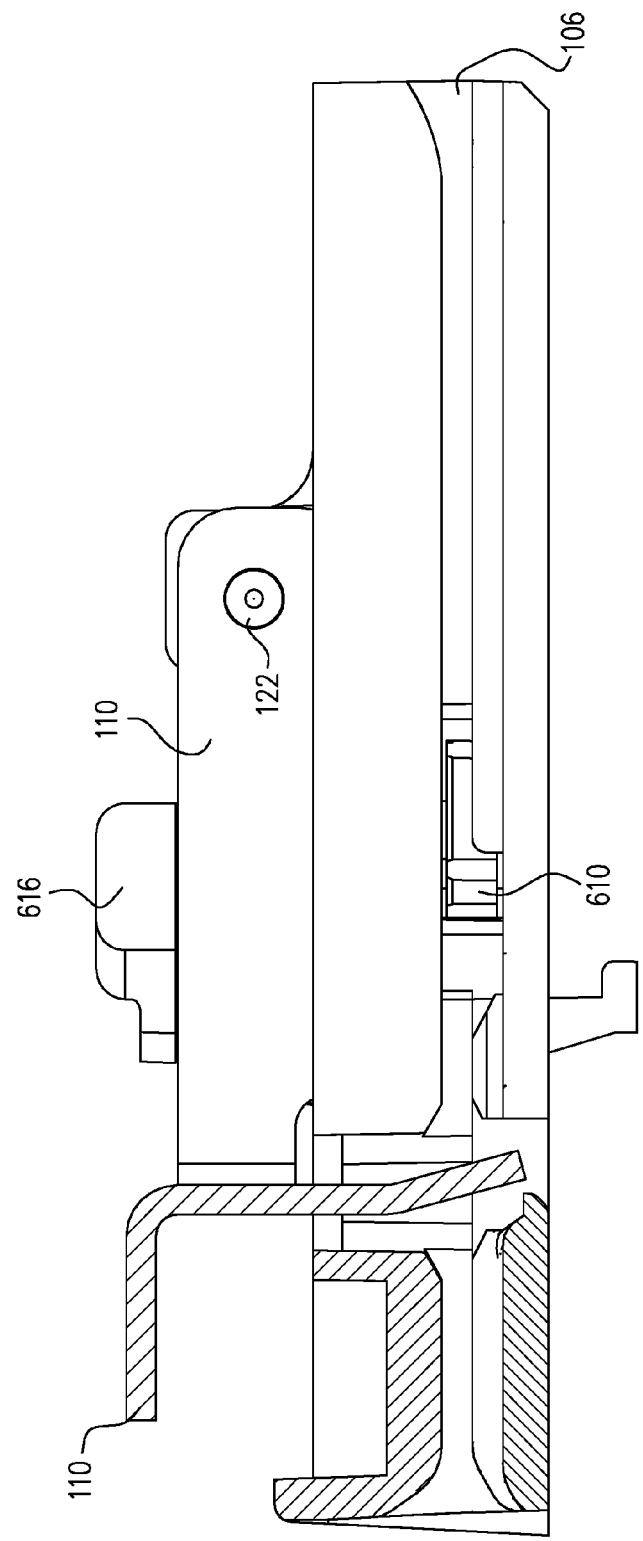

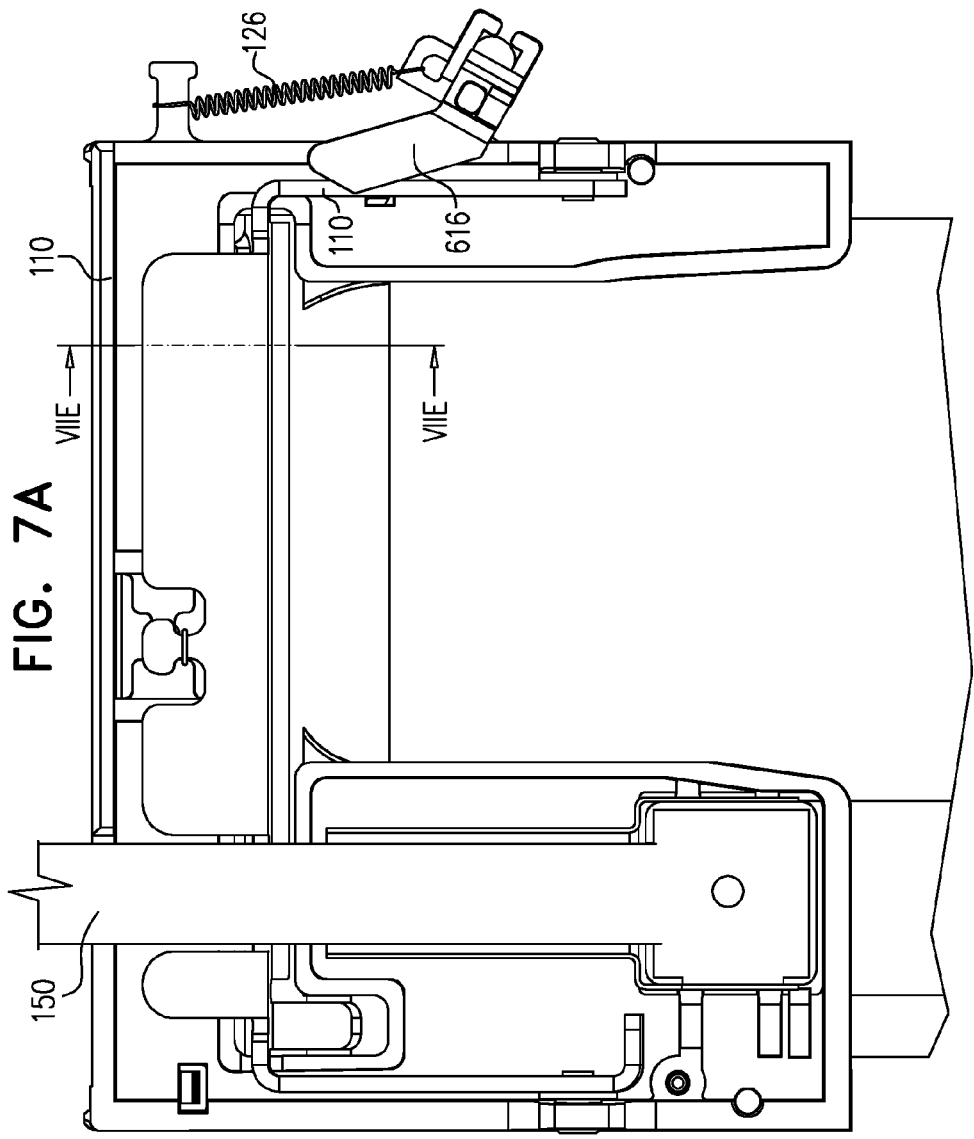

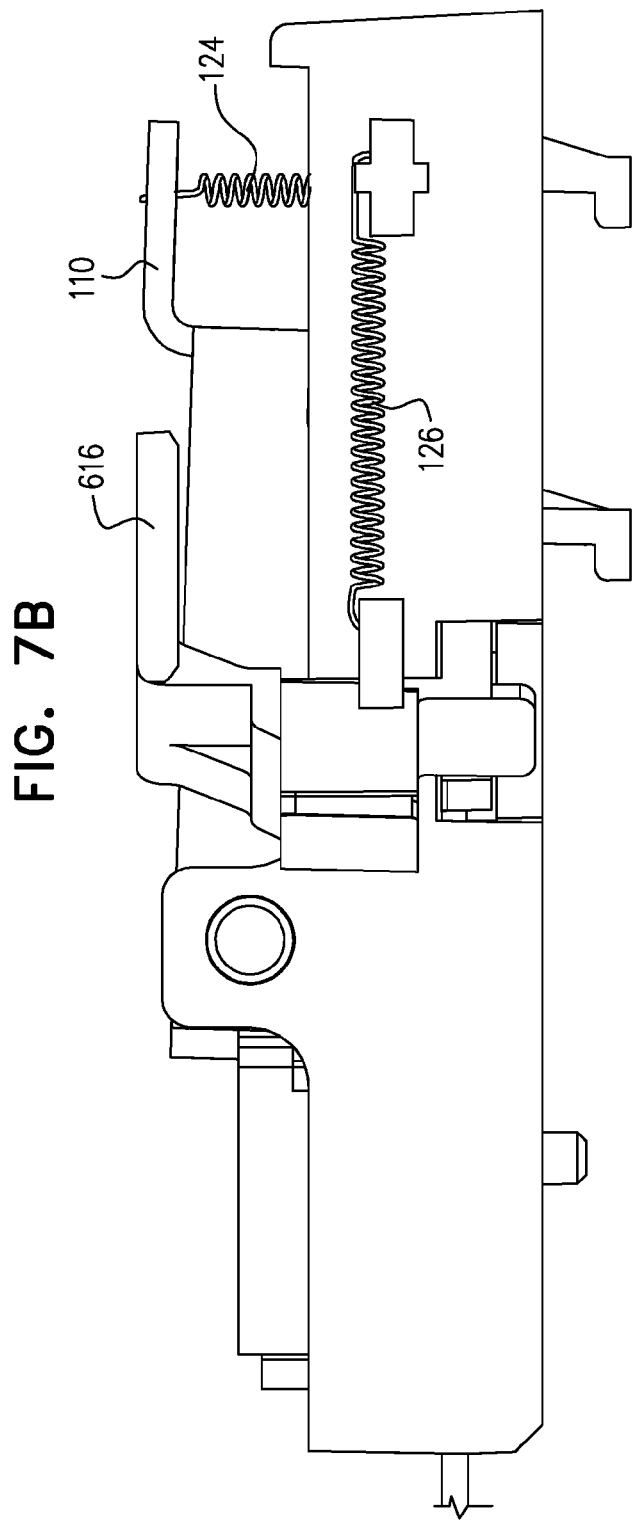

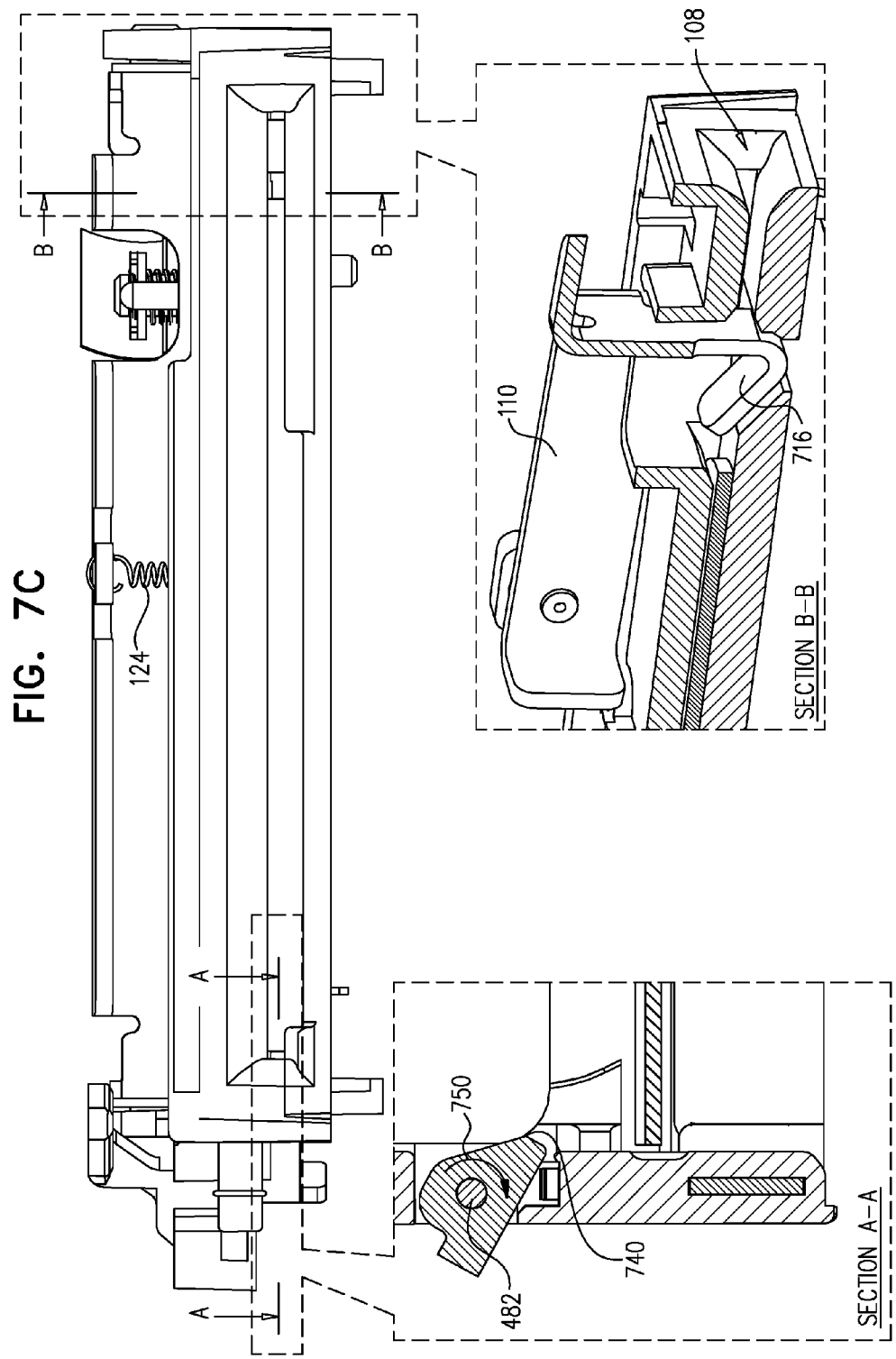

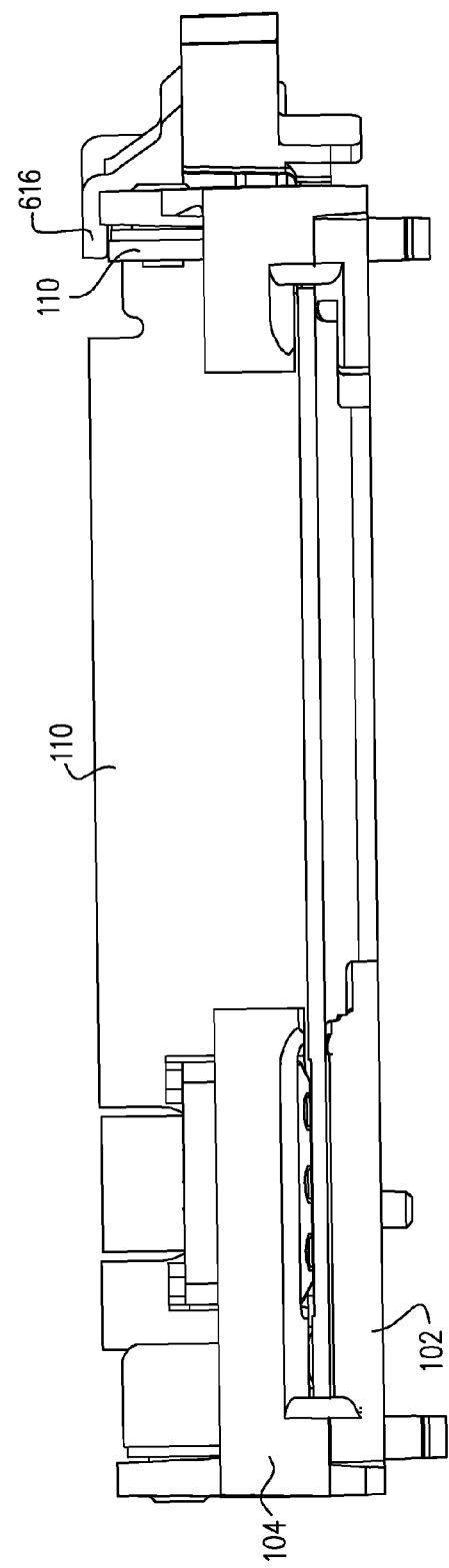

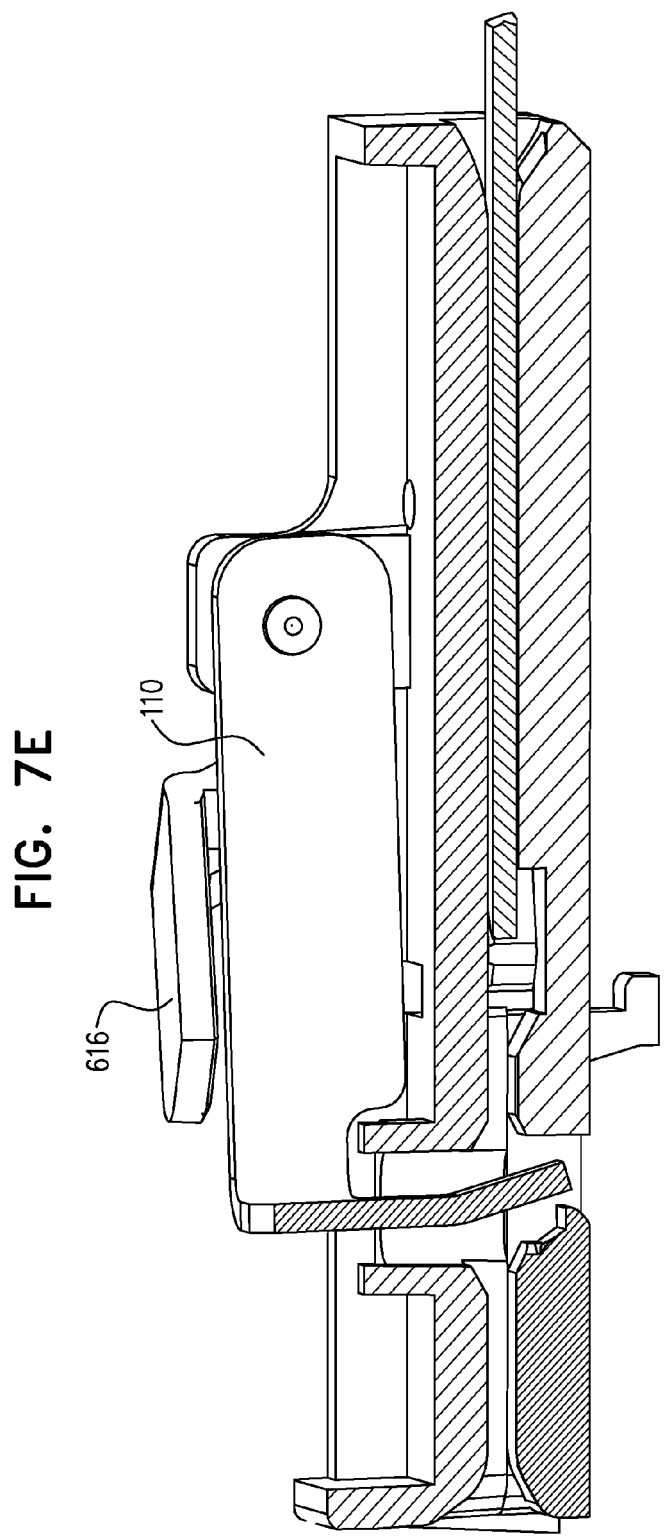

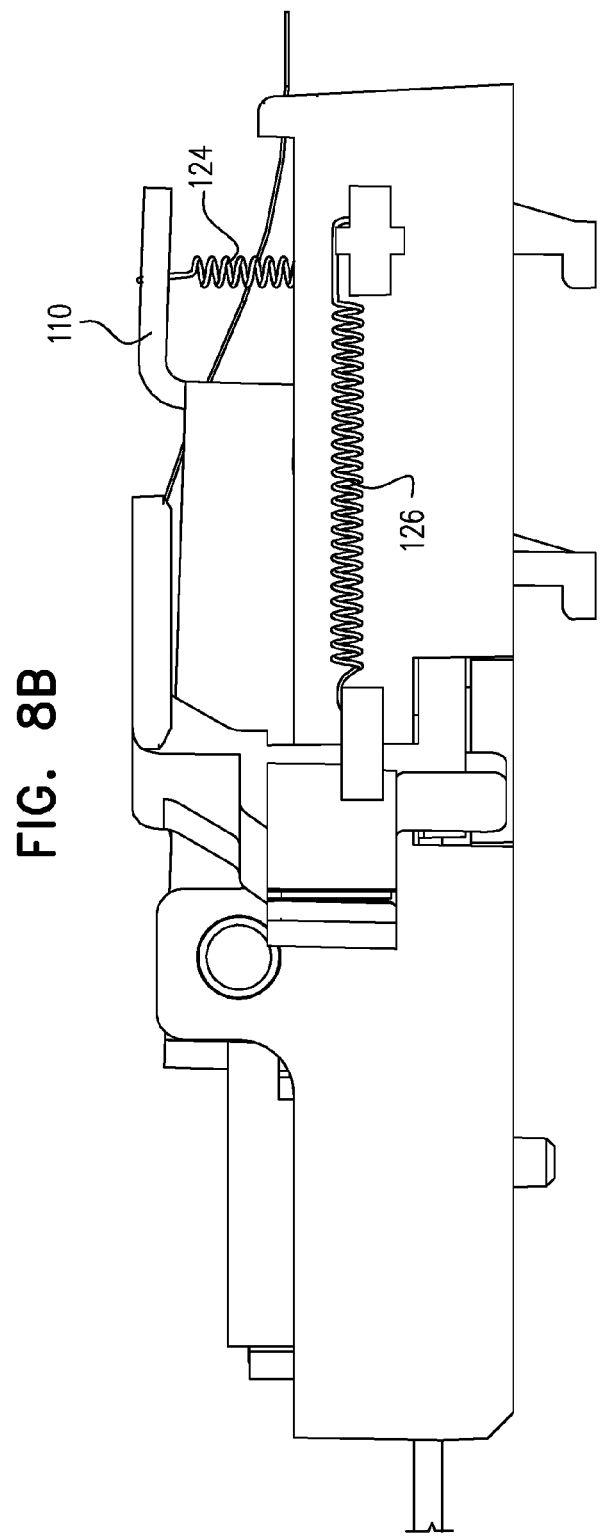

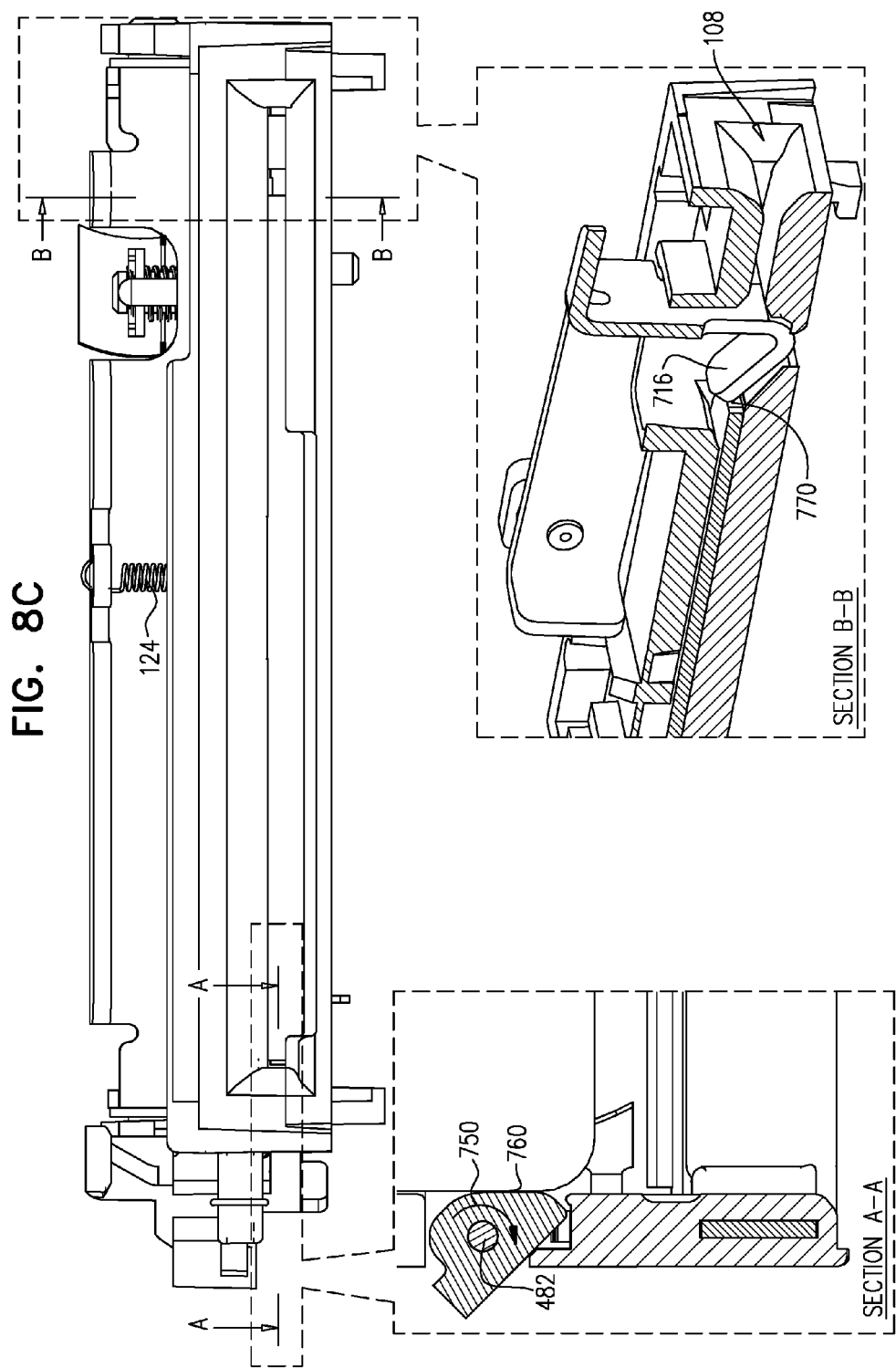

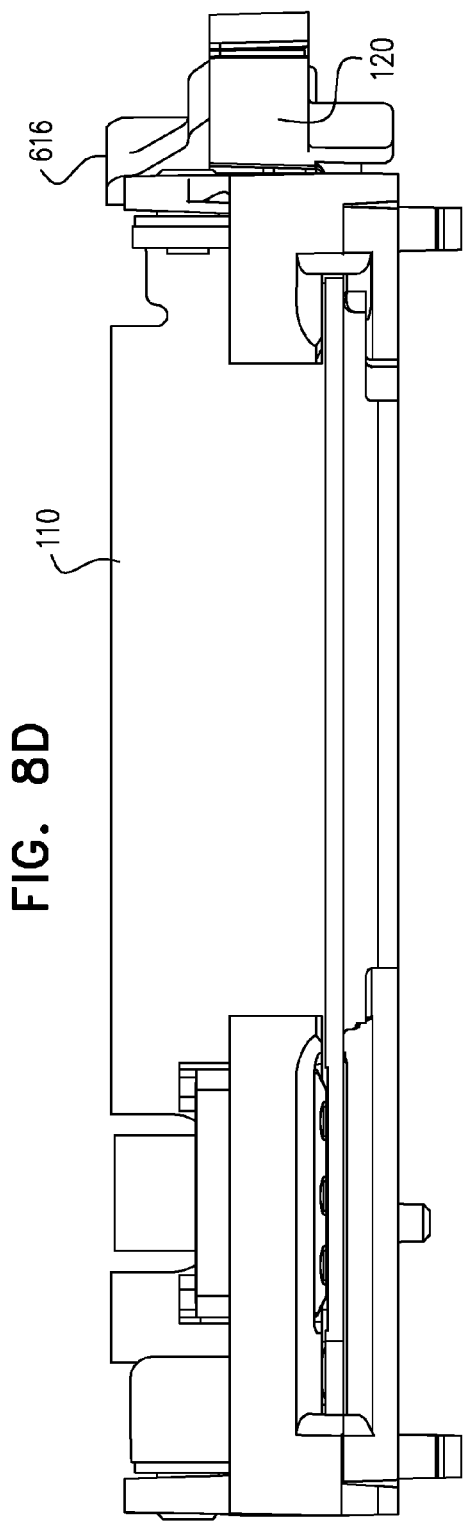

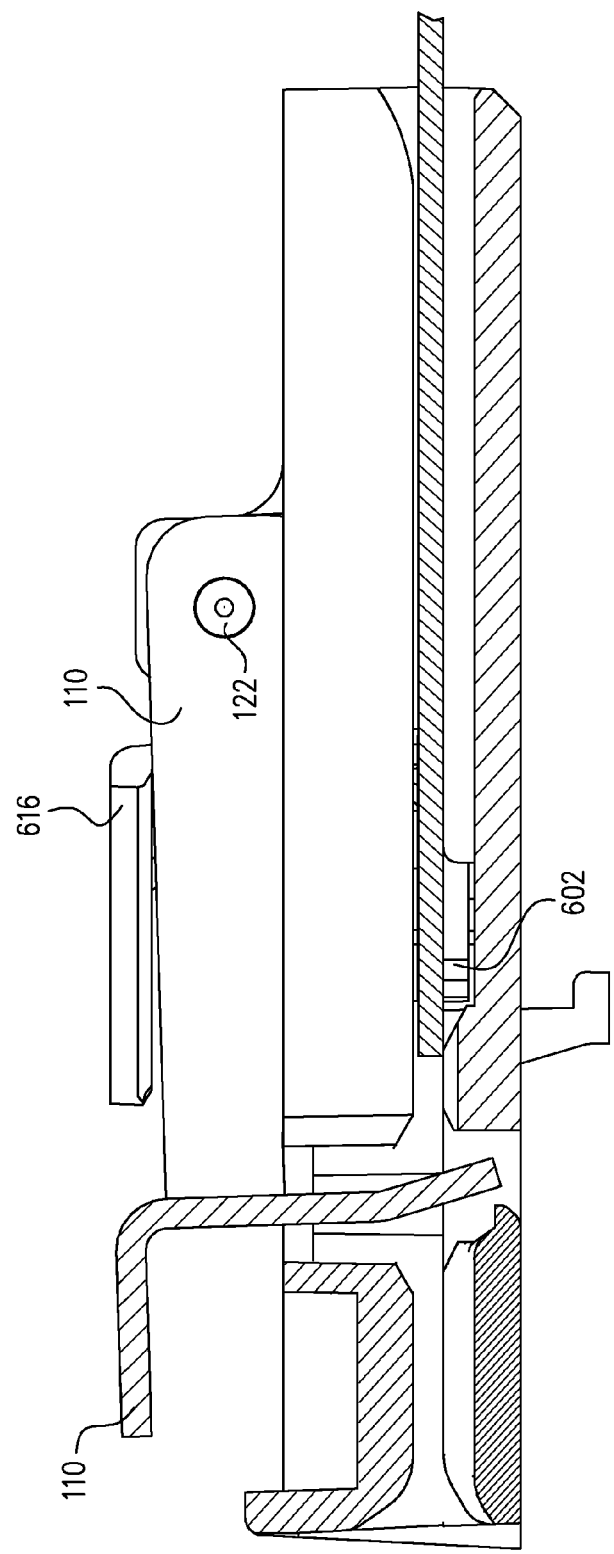

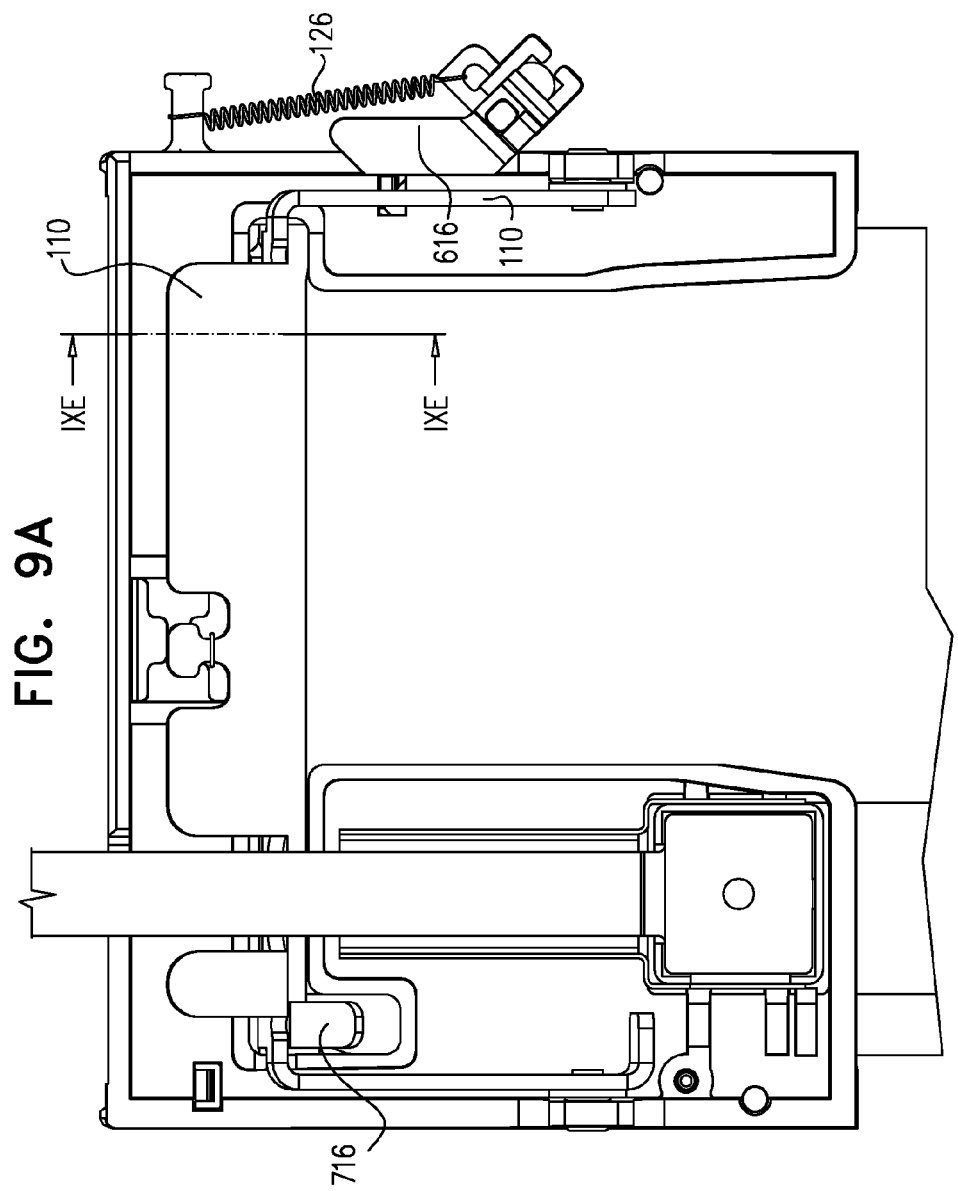

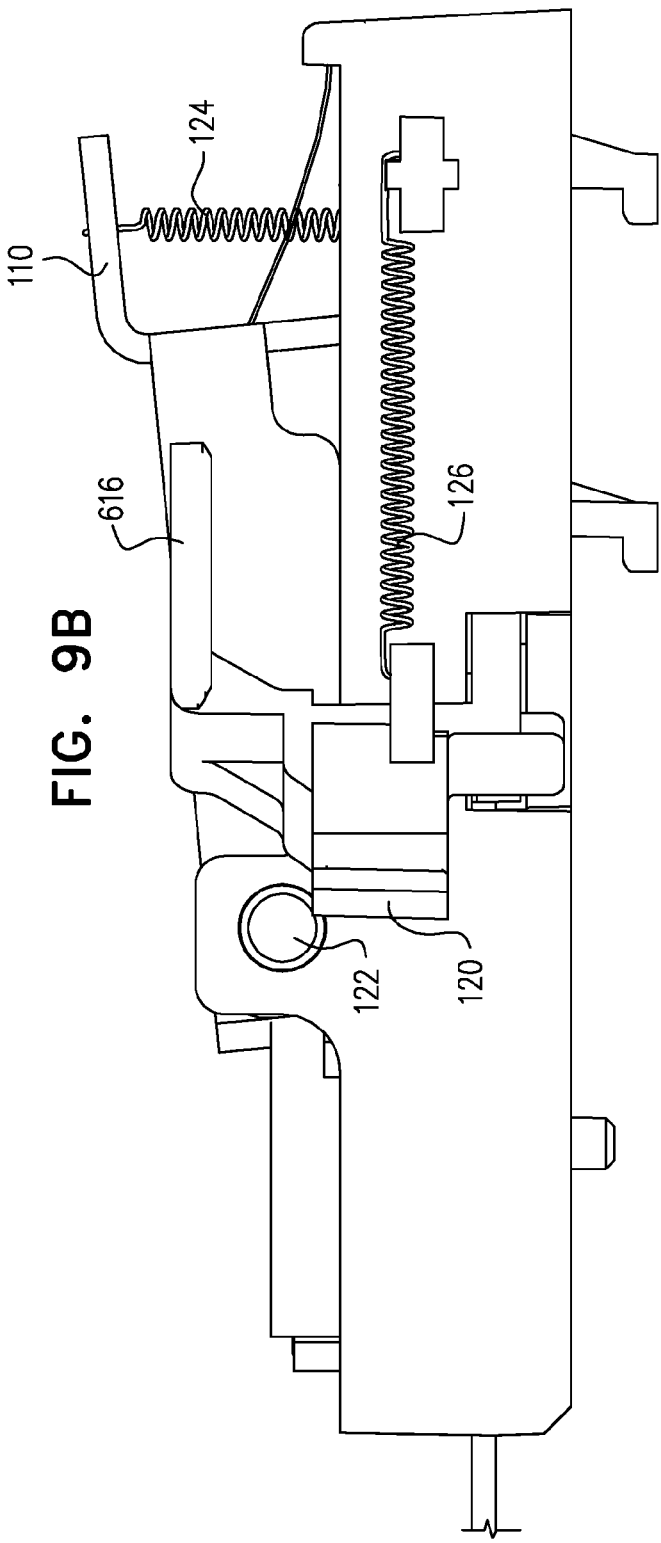

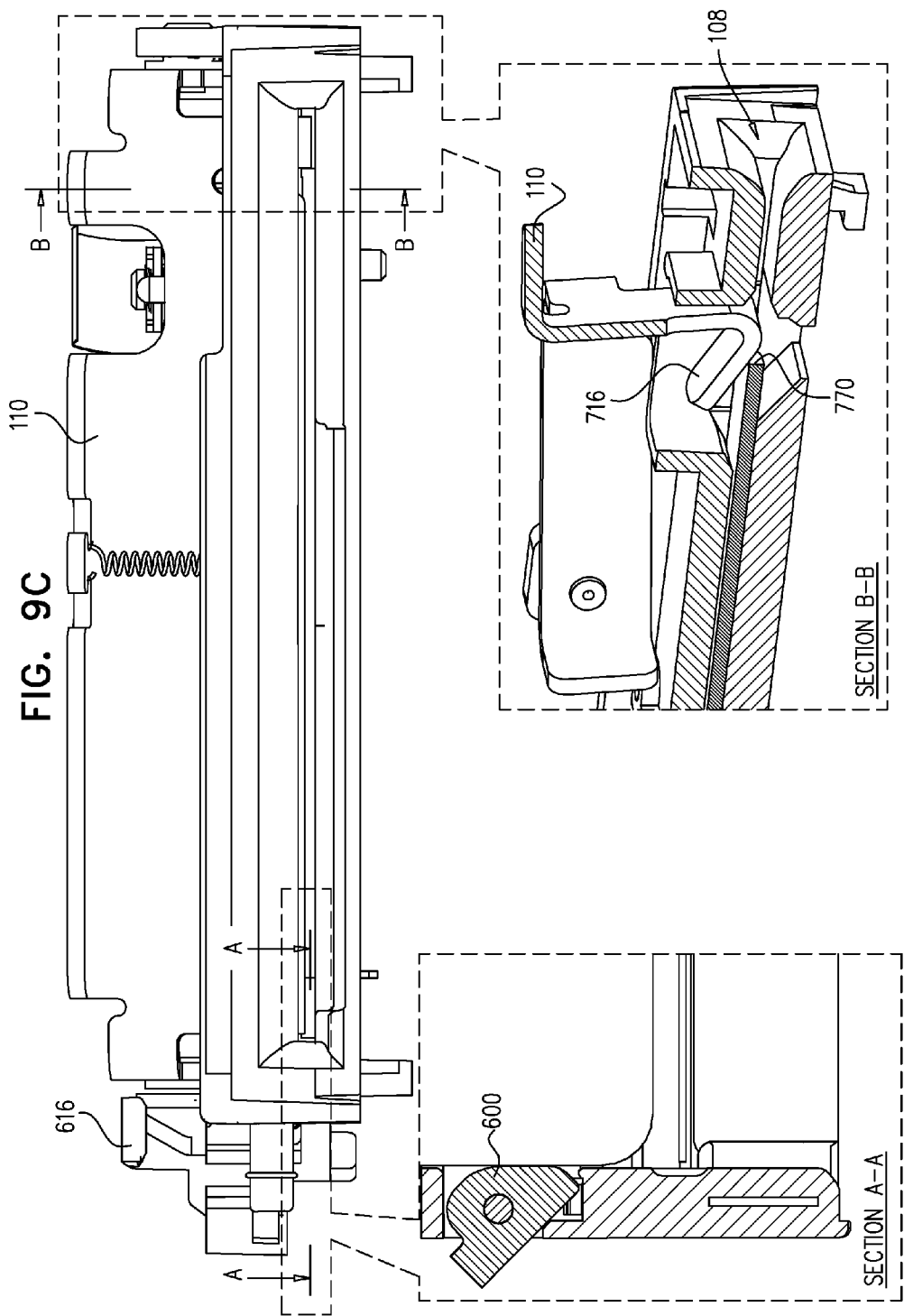

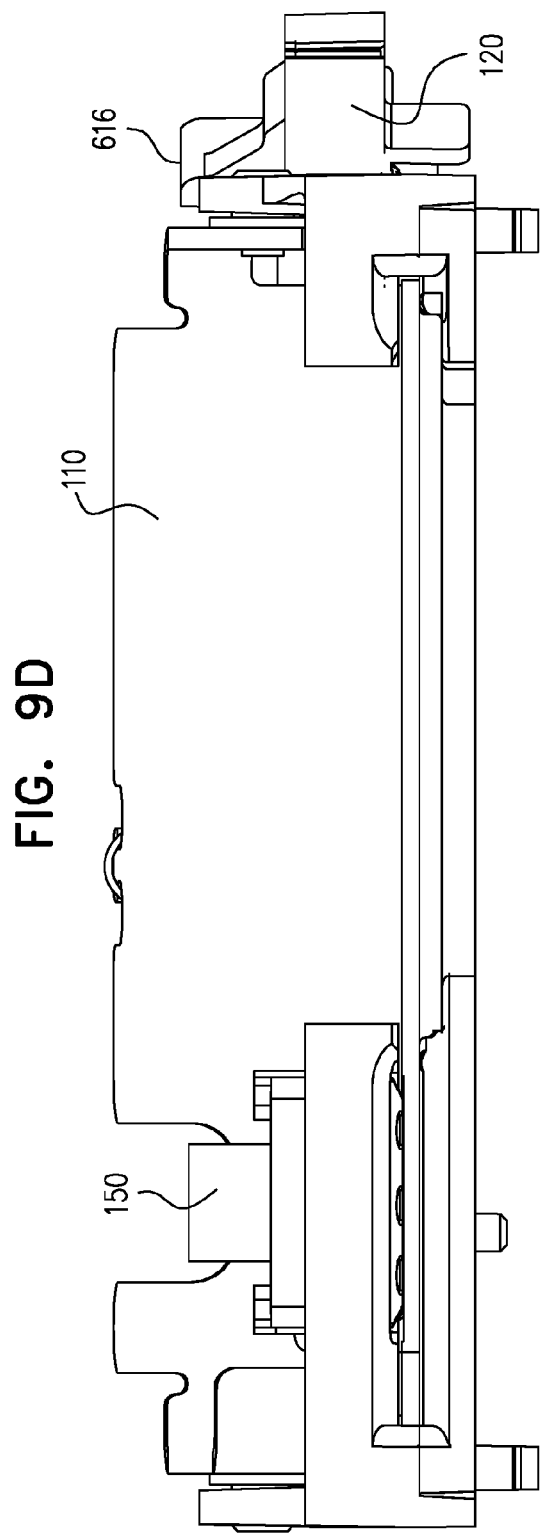

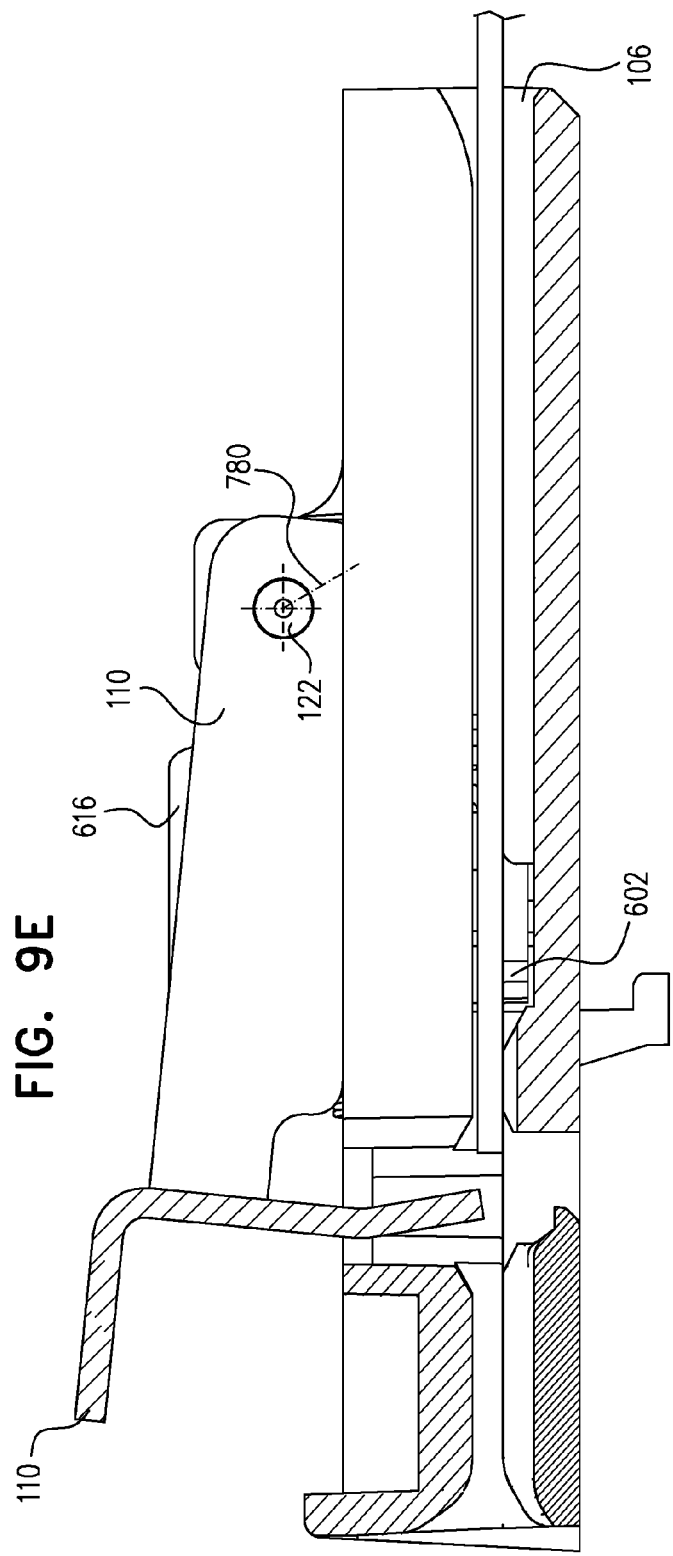

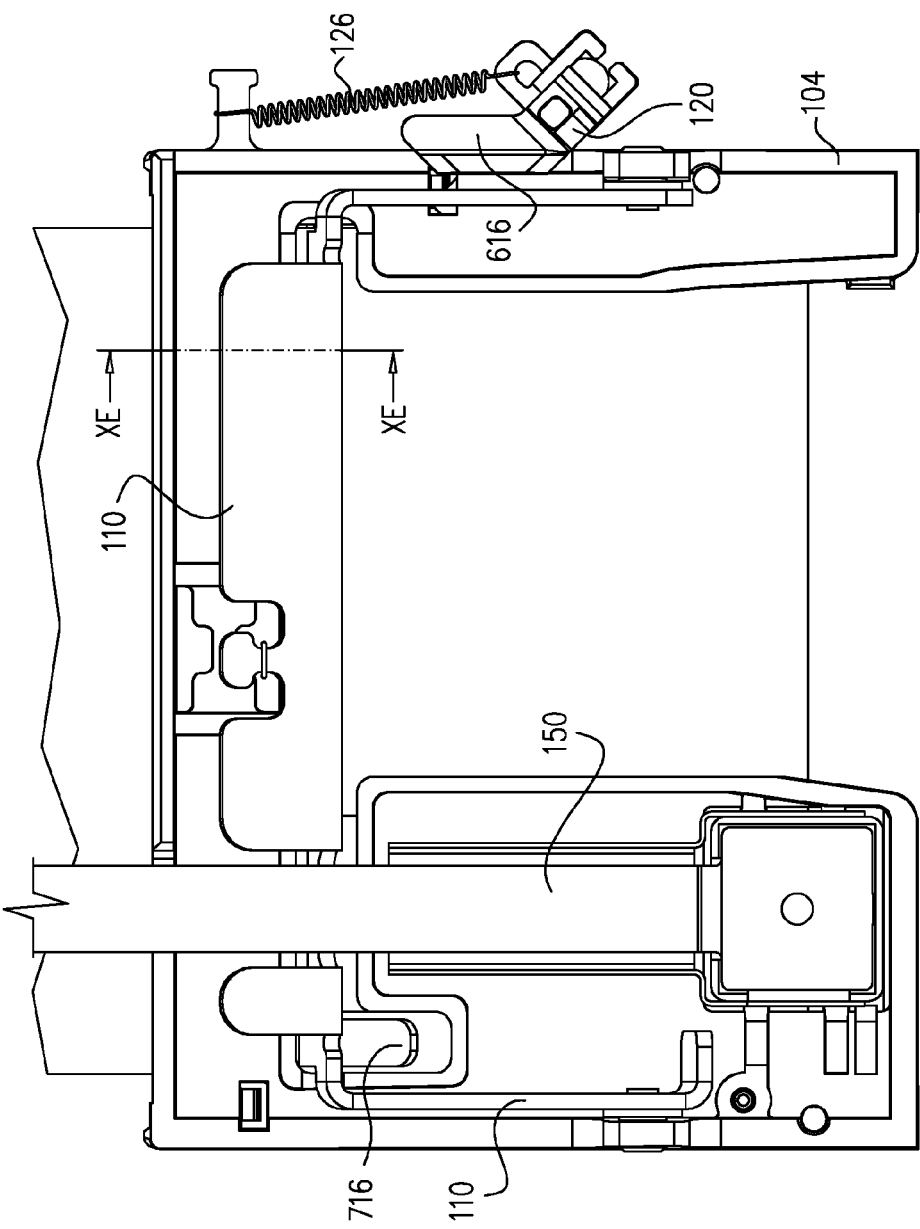

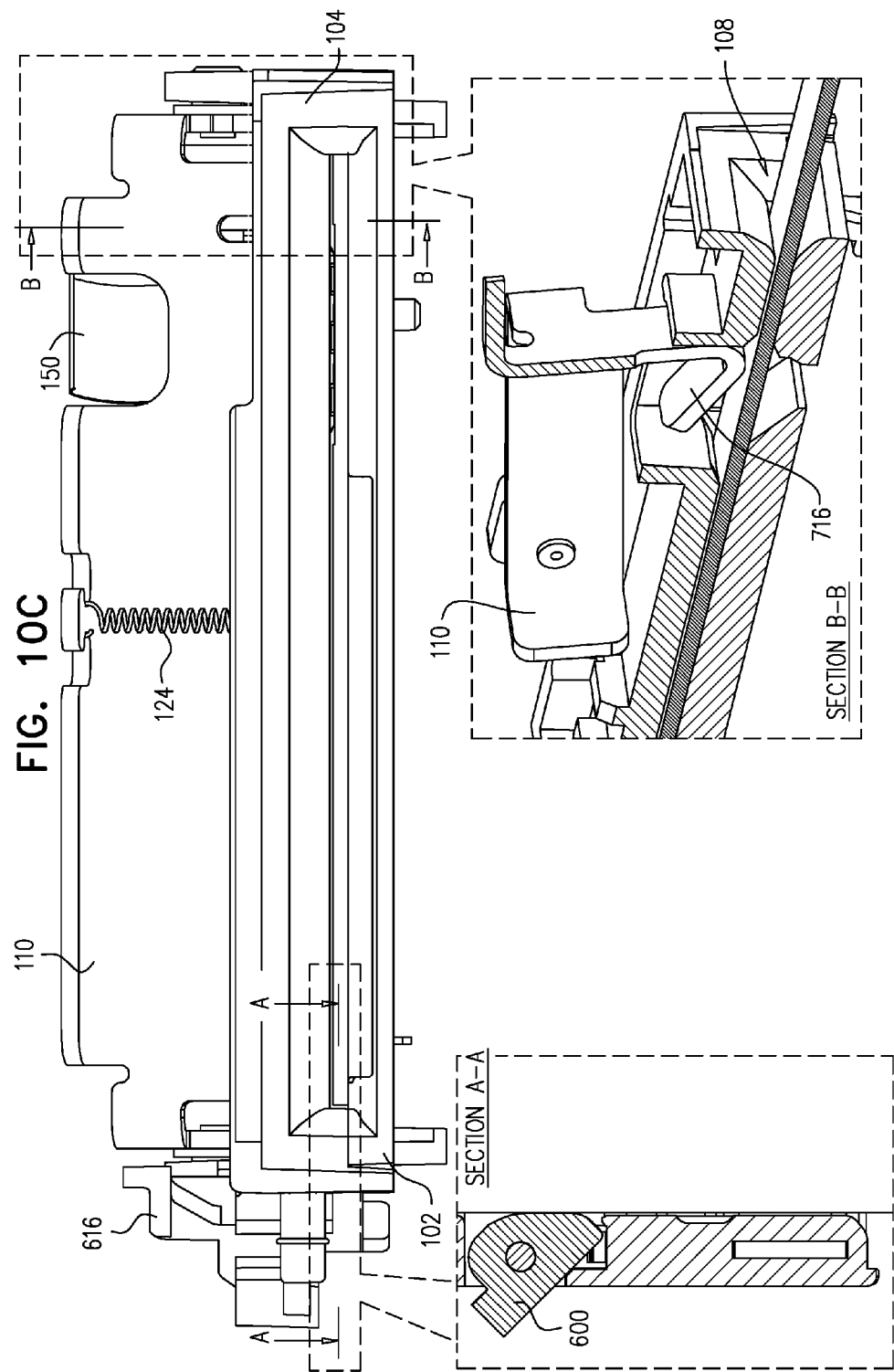

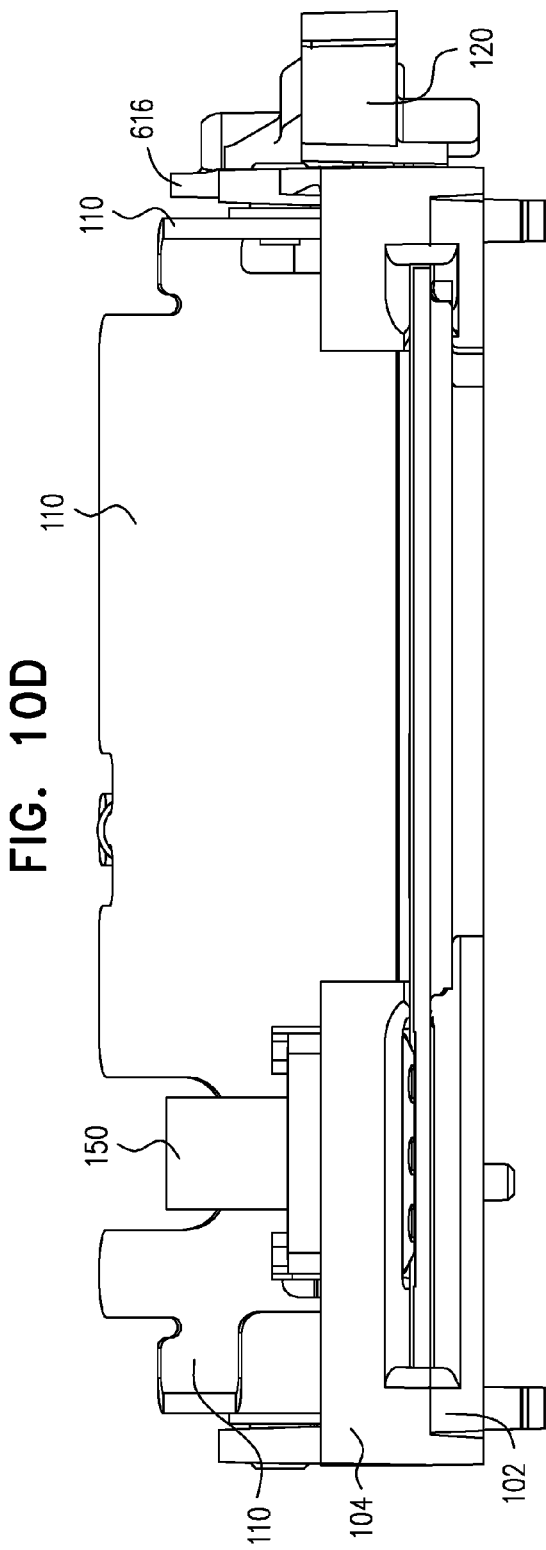

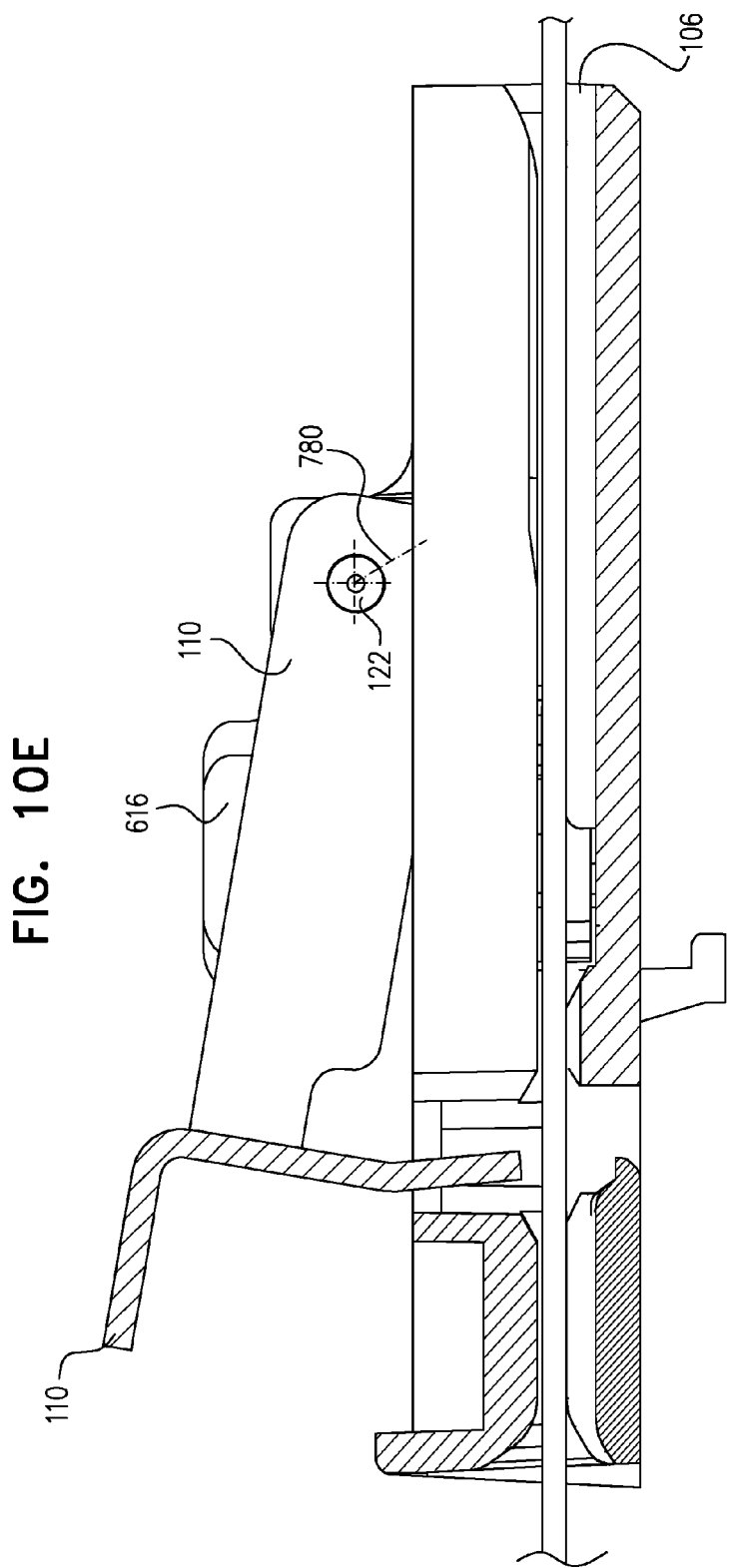

PAYMENT CARD RECEIVER WITH SELECTABLY BLOCKABLE SLOT

CROSS-REFERENCE TO RELATED APPLICATIONS

This application is a continuation of U.S. patent application Ser. No. 14/834,084 filed Aug. 24, 2015, which is incorporated herein by reference in its entirety.

FIELD OF THE INVENTION

The present invention relates to payment card receivers generally.

BACKGROUND OF THE INVENTION

Various types of payment card receivers are known.

SUMMARY OF THE INVENTION

The present invention seeks to provide an improved payment card receiver.

There is thus provided in accordance with a preferred embodiment of the present invention a payment card receiver including at least one element defining a payment card receiving slot, a shutter, pivotably mounted with respect to the payment card receiving slot for selectably blocking the payment card receiving slot and a card-operated shutter movement restricting switch operative to retain the shutter in a shutter movement restricting operative orientation, in which the shutter blocks the payment card receiving slot, in the absence of at least partial insertion of a payment card in the payment card receiving slot.

Preferably, the card-operated shutter movement restricting switch is rotatable relative to the at least one element from the shutter movement restricting operative orientation to a non shutter movement restricting operative orientation. Additionally or alternatively, the card-operated shutter movement restricting switch includes a trigger portion located within the payment card receiving slot for being rotated by insertion of a payment card into engagement with the trigger in the slot. Additionally, rotation of the trigger portion produces rotation of the shutter movement restricting switch from the shutter movement restricting operative orientation to the non shutter movement restricting operative orientation.

In accordance with a preferred embodiment of the present invention the card-operated shutter movement restricting switch is spring loaded to normally be in the shutter movement restricting operative orientation in the absence of engagement therewith by a payment card in the slot.

Preferably, the card-operated shutter movement restricting switch includes a sensible element whose position can be electronically sensed to provide an indication of its operative orientation. In accordance with a preferred embodiment of the present invention the card-operated shutter movement restricting switch includes a conductor whose position can be electronically sensed to provide an indication of its operative orientation.

In accordance with a preferred embodiment of the present invention the shutter is pivotably rotated from a payment card receiving slot blocking operative orientation to a non blocking operative orientation by engagement therewith with a card inserted into the payment card receiving slot to at least a first predetermined extent. Additionally, the card-operated shutter movement restricting switch is rotated from a shutter retaining operative orientation to a shutter non-retaining operative orientation by engagement therewith with a card inserted into the payment card receiving slot to at least a second predetermined extent, which is less than the first predetermined extent.

BRIEF DESCRIPTION OF THE DRAWINGS

The present invention will be understood and appreciated more fully from the following detailed description, taken in conjunction with the drawings in which:

FIGS. 1A, 1B and 1C are respective simplified assembled front pictorial view, assembled back pictorial view and exploded view illustrations of a magnetic stripe card receiver constructed and operative in accordance with a preferred embodiment of the present invention;

FIGS. 2A and 2B are respective simplified top and bottom planar views of a base element forming part of the magnetic stripe card receiver of FIGS. 1A-1C;

FIGS. 3A and 3B are respective simplified top and bottom planar views of an upper element forming part of the magnetic stripe card receiver of FIGS. 1A-1C;

FIGS. 4A, 4B and 4C are simplified first, second and third perspective view illustrations of a card-operated shutter movement restricting switch;

FIGS. 5A and 5B are respective simplified first and second perspective view illustrations of a card-operated shutter;

FIGS. 6A, 6B, 6C, 6D and 6E are respective simplified top view, side view, back view, front view and sectional illustrations of the magnetic stripe card receiver of FIGS. 1A-5B in a first operative orientation when a card is not inserted in the magnetic stripe card receiver;

FIGS. 7A, 7B, 7C, 7D and 7E are simplified illustrations of the magnetic stripe card receiver of FIGS. 1A-5B in a second operative orientation when a card is partially inserted in the magnetic stripe card receiver;

FIGS. 8A, 8B, 8C, 8D and 8E are simplified illustrations of the magnetic stripe card receiver of FIGS. 1A-5B in a third operative orientation when the card is further inserted in the magnetic stripe card receiver;

FIGS. 9A, 9B, 9C, 9D and 9E are simplified illustrations of the magnetic stripe card receiver of FIGS. 1A-5B in a fourth operative orientation when the card is still further inserted in the magnetic stripe card receiver; and FIGS. 10A, 10B, 10C, 10D and 10E are simplified illustrations of the magnetic stripe card receiver of FIGS. 1A-5B in a fifth operative orientation when the card is further inserted in the magnetic stripe card receiver.

DETAILED DESCRIPTION OF A PREFERRED EMBODIMENT

Figure 1A:
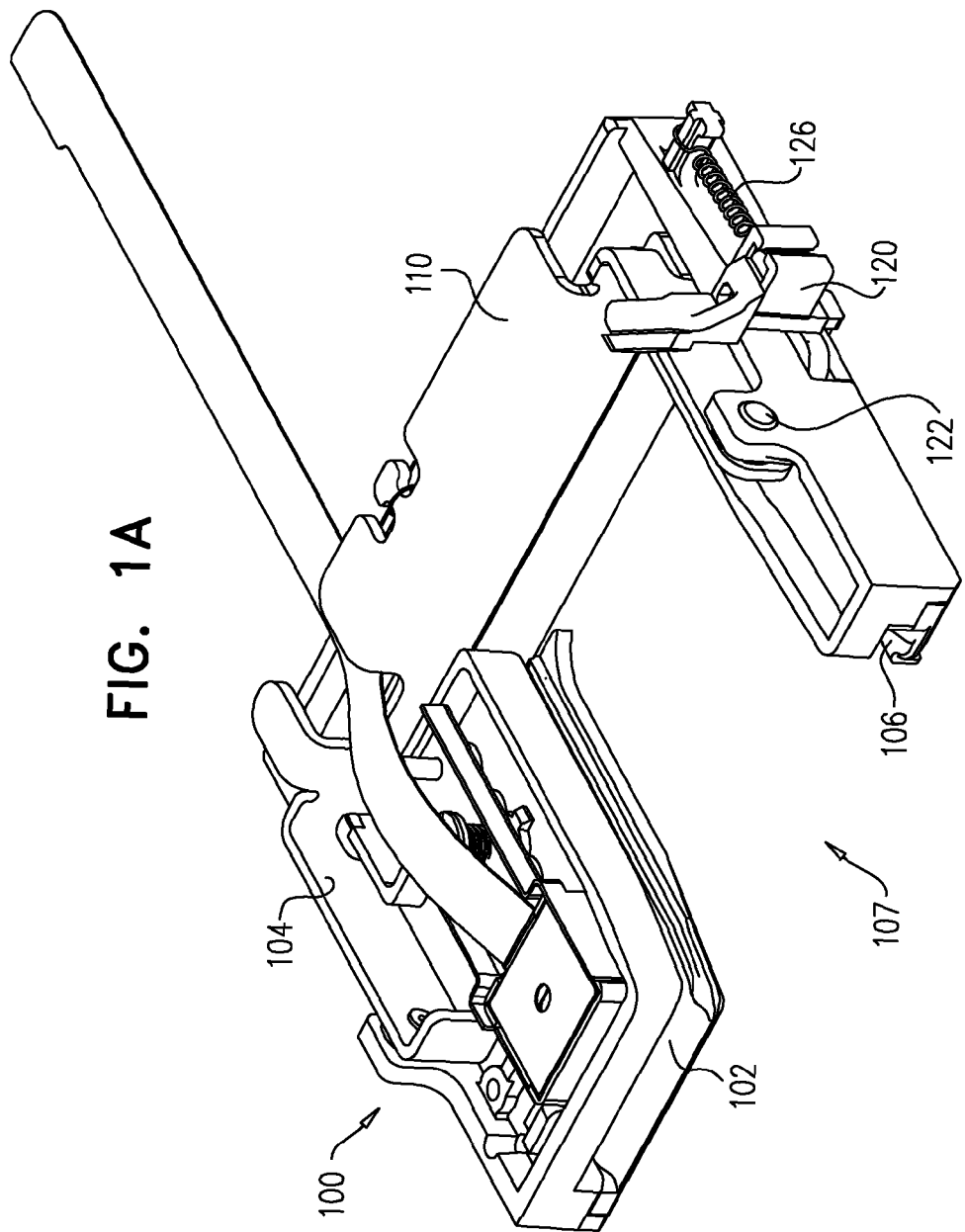
Figure 1C:
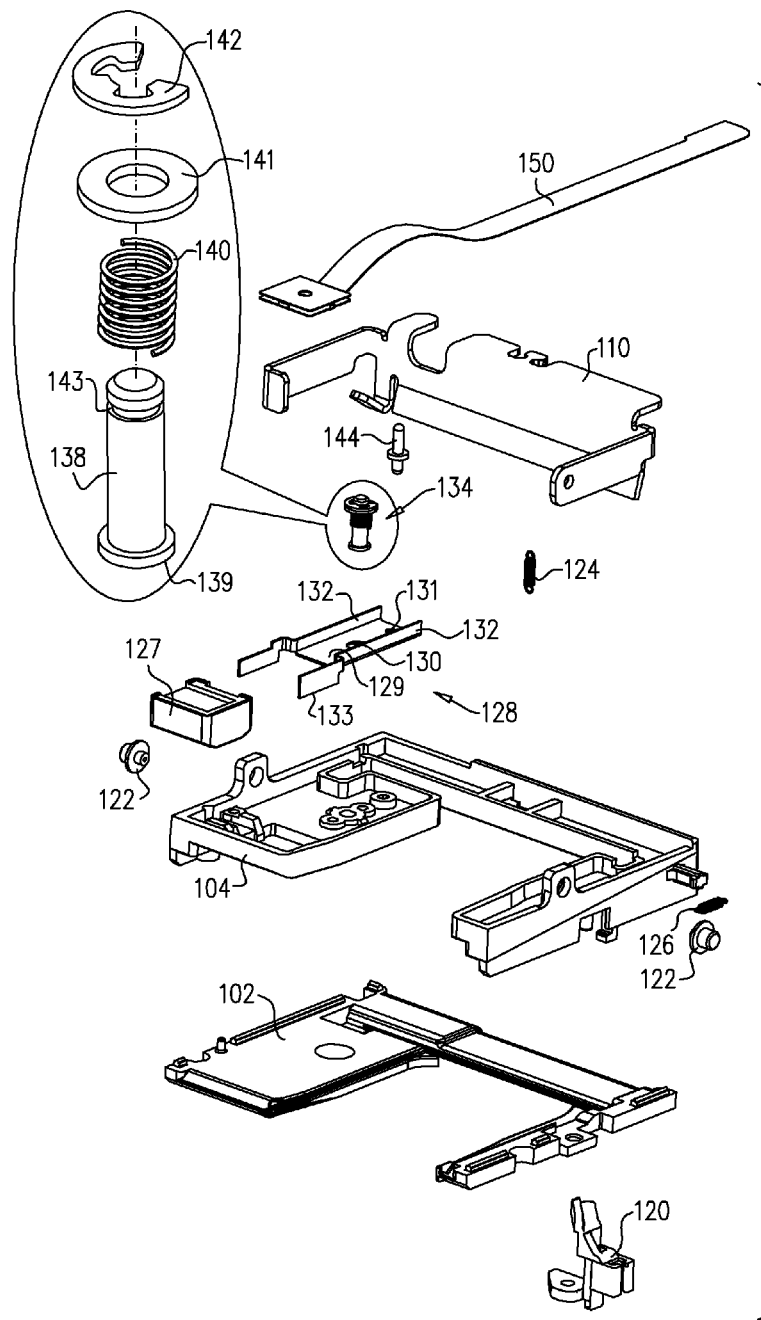

Reference is now made to FIGS. 1A-1C, which are respective simplified assembled front pictorial view, assembled back pictorial view and exploded view illustrations of a magnetic stripe card receiver constructed and operative in accordance with a preferred embodiment of the present invention.

As seen in FIGS. 1A-1C, there is provided a magnetic stripe card receiver 100 including a base element 102, preferably injection molded of plastic, onto which is fixedly mounted an upper element 104, preferably injection molded of plastic, to define a card-receiving slot 106 having a U-shaped front opening 107 and a rear opening 108 (FIG. 6C). Mounting of upper element 104 onto base element 102 may be effected in any suitable manner, such as by heat welding, snap fitting or the use of fasteners.

In accordance with a preferred embodiment of the present invention there is provided a card-operated shutter 110 which prevents insertion of foreign sharp objects, such as flat head screwdrivers or knives, into card-receiving slot 106 from rear opening 108. Further in accordance with a preferred embodiment of the present invention a card-operated shutter movement restricting switch 120 is provided for restricting opening of the shutter 110 in the absence of a payment card sized card in card-receiving slot 106.

Card-operated shutter 110 is pivotably mounted onto upper element 104, preferably via a pair of pivot pins 122 and is urged to a normally slot blocking operative orientation by a spring 124 and card-operated shutter movement restricting switch 120 is preferably urged towards a card-receiving slot engaging rotational position by a spring 126.

Fixedly mounted onto upper element 104 is a magnetic stripe card reader 127, which is preferably yieldably mounted onto upper element 104 via a mounting bracket 128. Mounting bracket 128 preferably includes a planar portion 129 having formed therein apertures 130 and 131. Extending alongside planar portion 129 are a pair of side portions 132, which are symmetric mirror images of each other and which extend forwardly of planar portion 129 to define retaining arms 133 onto which magnetic strip card reader 127 is mounted preferably by spot welding.

A spring assembly 134 engages bracket 128 at aperture 130 in bracket 128. Spring assembly 134 preferably includes a shaft 138 having a bottom flange 139. Shaft 138 extends through aperture 130 in mounting bracket 128. A compression spring 140 is located about shaft 138 above mounting bracket 128 and is seated between mounting bracket 128 and a washer 141, which is located about shaft 138 above spring 140. A lock washer 142 engages a circumferential recess 143 in shaft 138 and limits upward displacement of washer 141 and thus of spring 140, such that spring 140 always urges mounting bracket 128 downwardly in the sense of FIGS. 1A-1C.

The positioning of bracket 128 relative to slot 106 is limited by a slidable mounting pin 144, which is fixed onto upper element 104 and slidingly extends through an aperture 131 in bracket 128.

A flexible PCB and flat connector assembly 150 communicates signals from the magnetic stripe card reader 127 to utilization circuitry (not shown).

Figure 2A:
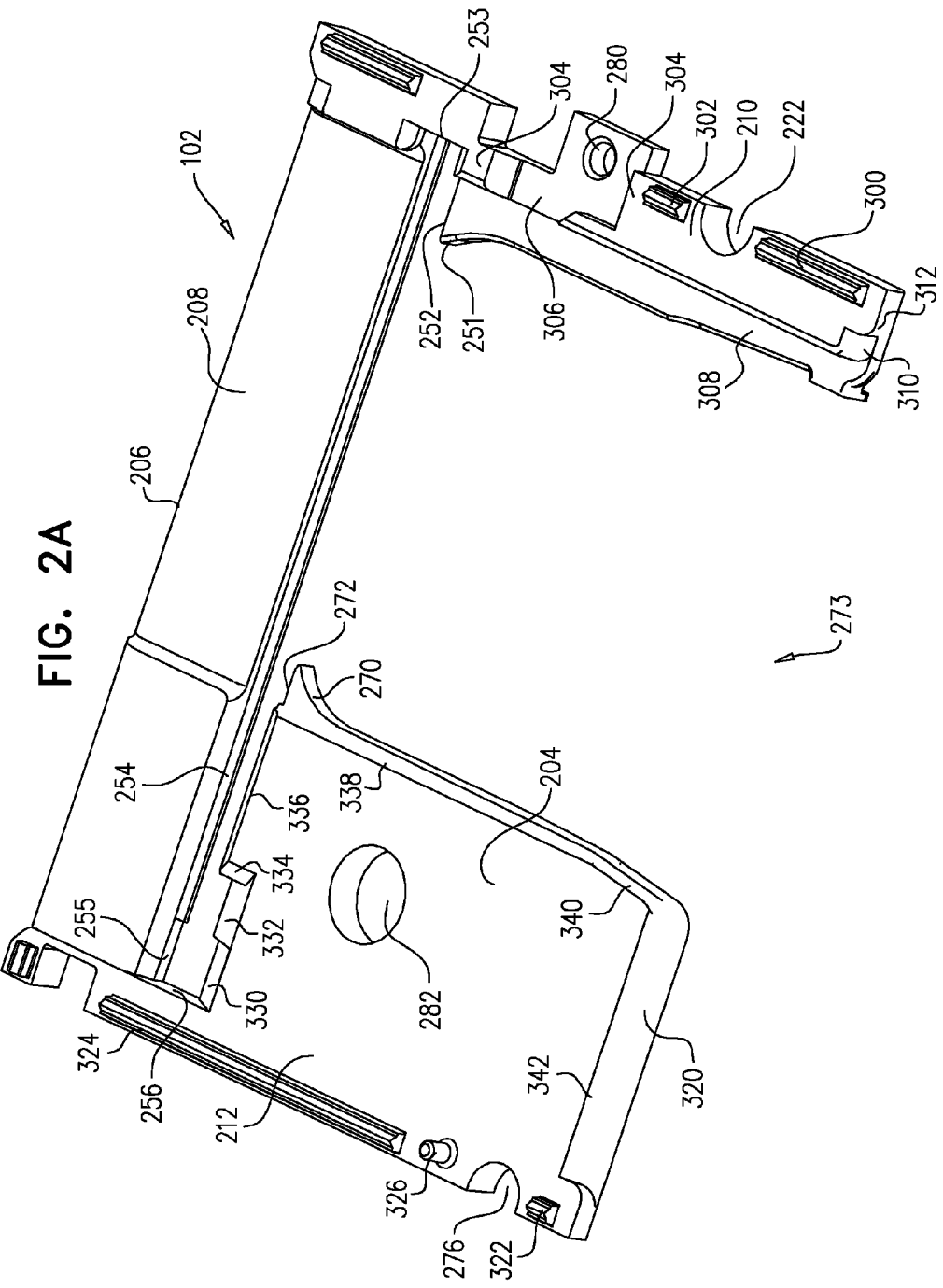

Reference is now made to FIGS. 2A and 2B, which are respective simplified top and bottom planar views of base element 102, forming part of the magnetic stripe card receiver of FIGS. 1A-1C.

As seen in FIGS. 2A and 2B, base element 102 is a generally planar element having a generally flat bottom surface 202 and a generally flat, multi-level top surface 204. Base element 102 defines a back edge 206, a back transverse portion 208 and first and second forwardly-extending portions 210 and 212.

Considering the bottom surface 202 of base element 102, as seen in FIG. 2B, it is seen that first forwardly-extending portion 210 is relatively narrow and has a generally straight outwardly facing edge 220 having a cut out 222 and terminating at a shoulder 224. An edge 226 extends rearwardly from shoulder 224 to a cut out 228, which defines a shoulder 230. An edge 232 of back transverse portion 208 extends rearwardly from shoulder 230 to back edge 206.

First forwardly-extending portion 210 preferably defines a forwardly-facing tapered edge 240 and a tapered, slightly inwardly directed, inwardly-facing edge 242, which includes a generally straight, rearwardly-directed portion 244 and an inwardly curved portion 246, which terminates rearwardly in a non-tapered generally straight rearwardly-directed edge 248. Edge 248 terminates rearwardly in an inwardly curved portion 250, which terminates in a further inwardly curved portion 251. Portion 251 terminates in a straight inner slit edge portion 252, which extends to a first inner slit end edge 253, which in turn extends to a curved forward facing edge 254 of back transverse portion 208.

Curved forward facing edge 254 extends transversely to a straight forward facing edge 255, which in turn extends to a second inner slit end edge 256.

Second forwardly-extending portion 212 preferably defines a forwardly-facing tapered edge 260 and a tapered, slightly inwardly directed, inwardly-facing edge 262, which terminates rearwardly in a non-tapered generally straight rearwardly-directed edge 268. Edge 268 terminates rearwardly in an inwardly curved portion 270, which terminates in a straight inner slit edge portion 272, which extends to second inner slit end edge 256.

It is appreciated that the various inwardly directed edges define a generally rectangular cut out 273 in base element 102.

Second forwardly-extending portion 212 also defines a generally straight rearwardly-extending edge 274 having a curved cut out 276 at a forward portion thereof and a rectangular cut out 278 at a rearward portion thereof. Edge 274 terminates at rear edge 206.

First forwardly-extending portion 210 defines an aperture 280, which serves as a base for rotatable mounting of card-operated shutter movement restricting switch 120 (FIGS. 1A-1C).

Second forwardly-extending portion 212 defines an aperture 282 for accommodating spring assembly 134 (FIGS. 1A-1C).

Considering the top surface 204 of base element 102, as seen in FIG. 2A, it is seen that first forwardly-extending portion 210 has a pair of co-axial mutually spaced elongate protrusions 300 and 302 extending generally parallel to edge 220 as well as an interrupted elongate raised portion 304 extending generally parallel to and underlying protrusions 300 and 302 and having a gap 306. The top surface 204 of base element 102 includes an inward-extending surface 308 inwardly of raised portion 304.

The top surface 204 of first forwardly-extending portion 210 has a tapered forward edge which includes a tapered forward edge surface 310 of raised portion 304. It is also noted that the top surface 204 of first forwardly-extending portion 210 has an outwardly and forwardly tapered inwardly and forwardly facing side edge 312.

The top surface 204 of second forwardly-extending portion 212 preferably defines a forwardly-facing tapered edge 320 which smoothly joins tapered, slightly inwardly directed, inwardly-facing edge 262.

The top surface 204 of second forwardly-extending portion 212 also preferably defines a pair of co-axial mutually spaced elongate protrusions 322 and 324 extending generally parallel to edge 274 as well as a generally circular cylindrical protrusion 326. It is seen that at the top surface 204, extending generally along edge 272 (FIG. 2B) there are formed a plurality of multi-level edges including a first tapered transverse edge 330, which extends from second inner slit end edge 256 to a second tapered transverse edge 332, which, in turn, extends to a third tapered edge 334, generally perpendicular to edge 332. Edge 334 terminates at a fourth straight edge 336, which, in turn, terminates at a fifth straight edge 338, which generally overlies edge 268

(FIG. 2B). Fifth straight edge 338 terminates in an outwardly and forwardly inclined edge 340, generally overlying edge 262 (FIG. 2B) and which smoothly joins a transverse forward inclined edge 342, extending generally parallel to forwardly-facing tapered edge 320.

Figure 3B:
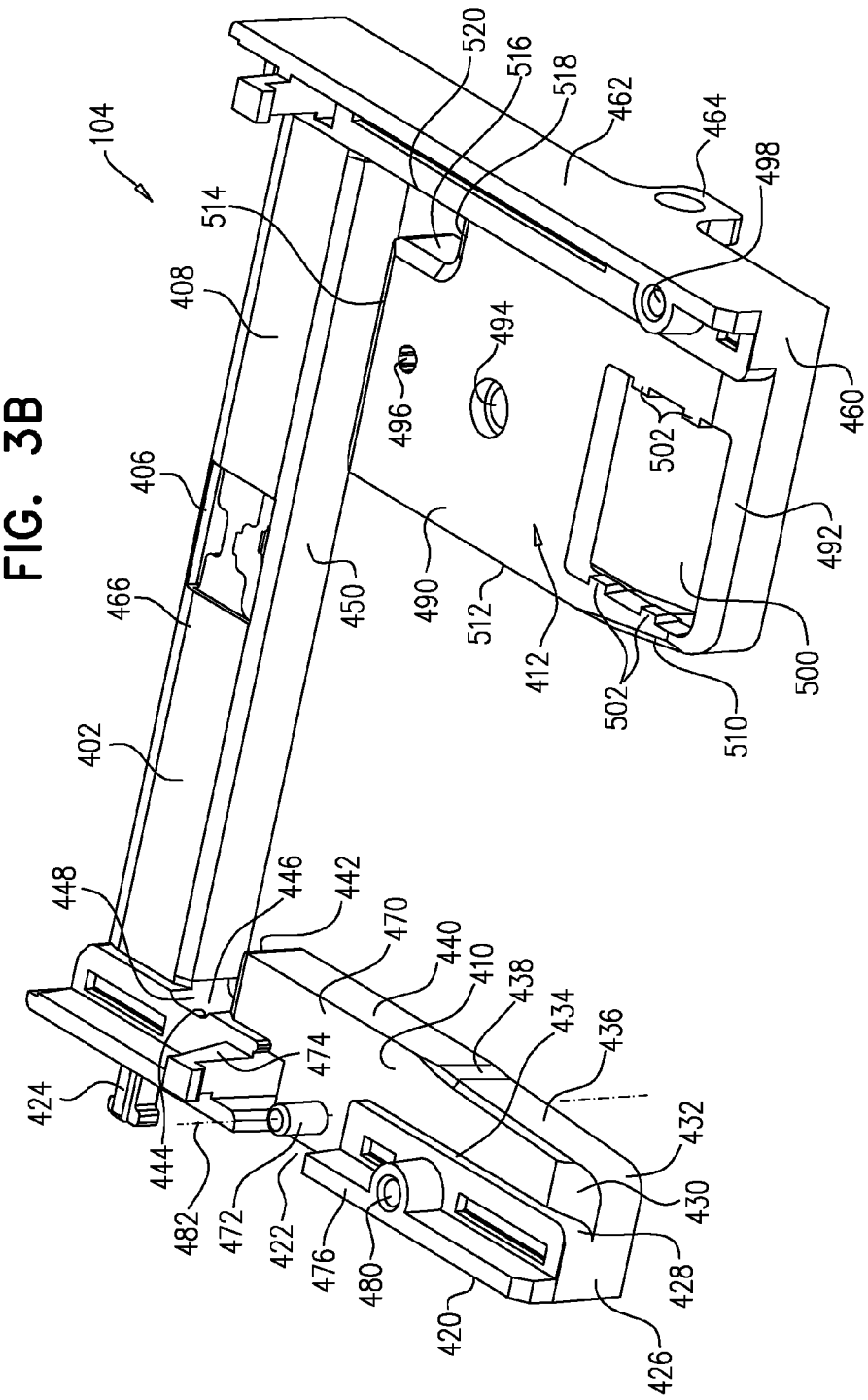

Reference is now made to FIGS. 3A and 3B, which are respective simplified top and bottom planar views of upper element 104, forming part of the magnetic stripe card receiver of FIGS. 1A-1C.

As seen in FIGS. 3A and 3B, upper element 104 is a generally planar element having a generally flat bottom surface 402 and a generally flat, multi-level top surface 404. Upper element 104 defines a back edge surface 406, a back transverse portion 408 and first and second forwardly-extending portions 410 and 412.

Considering the bottom surface 402 of upper element 104, as seen in FIG. 3B, it is seen that first forwardly-extending portion 410 is relatively narrow and has a generally straight outwardly facing edge surface 420 which includes an upwardly directed apertured pivot axis defining protrusion 421 (FIG. 3A) and having a cut out 422 and terminating at back edge surface 406. A spring seating protrusion 424 extends outwardly from edge surface 420, adjacent back edge surface 406.

First forwardly-extending portion 410 preferably defines a forwardly-facing surface 426, inwardly of which is a lower inwardly curved corner surface 428, a tapered, downwardly and rearwardly directed forward slot defining surface 430 and an upper inwardly curved corner surface 432.

Extending rearwardly from lower inwardly curved corner surface 428 parallel to edge surface 420 is a lower inwardly facing wall surface 434 which defines a side edge of card-receiving slot 106. Extending rearwardly from upper inwardly curved corner surface 432 parallel to edge surface 420 is an upper inwardly facing wall surface 436, which is slightly tapered inwardly. Surface 436 terminates rearwardly at an upper intermediate inwardly facing wall surface 438 which is tapered inwardly to a greater degree than is surface 436. Upper intermediate inwardly facing wall surface 438 terminates rearwardly at an upper inwardly facing wall surface 440, which extends generally parallel to edge surface 420.

Upper inwardly facing wall surface 440 terminates rearwardly at a rearward facing wall surface 442, which in turn terminates in a rearwardly inwardly facing corner wall surface 444, which in turn terminates in an inwardly facing wall surface 446, which in turn terminates in a forwardly inwardly facing corner wall surface 448. Surface 448 terminates in a forwardly facing edge surface 450, which extends generally parallel to edge surface 406.

Second forwardly-extending portion 412 preferably defines a forwardly-facing surface 460, which terminates outwardly in a rearwardly extending edge surface 462, which includes an upwardly directed apertured pivot axis defining protrusion 464, located opposite upwardly directed apertured pivot axis defining protrusion 421. Rearwardly extending edge surface 462 terminates rearwardly at edge surface 406.

Back transverse portion 408 preferably includes a downwardly forwardly tapered surface 466 underlying edge surface 406 and a spring mounting bridge 468.

First forwardly-extending portion 410 preferably includes, on a downwardly facing surface thereof, as seen in FIG. 3B, a rearwardly extending generally flat surface 470, which extends rearwardly from surface 430, a generally cylindrical protrusion 472, a toothed protrusion 474, a raised edge wall 476 extending rearwardly along edge surface 420 and an apertured mounting socket protrusion 480. Protrusion 472 defines an axis of rotation 482 for card-operated shutter movement restricting switch 120 (FIGS. 4A-4C).

Second forwardly-extending portion 412 preferably includes, on a downwardly facing surface thereof, as seen in FIG. 3B, a rearwardly extending generally flat surface 490, which extends rearwardly from a downwardly inwardly tapered surface 492, a generally circular stepped aperture 494, an aperture 496, and an apertured mounting socket protrusion 498. Second forwardly-extending portion 412 also preferably includes a cut out 500 preferably having four tabs 502 extending towards the interior thereof.

Second forwardly-extending portion 412 also defines a tapered, slightly inwardly directed, inwardly-facing edge surface 510, which terminates rearwardly in a non-tapered generally straight rearwardly-directed edge surface 512. Edge surface 512 terminates rearwardly at a rearward facing edge surface 514, which terminates in an outwardly facing edge surface 516, which in turn terminates in a rearwardly facing edge surface 518, which in turn terminates at an inward facing edge surface 520, which in turn terminates at forward facing edge surface 450.

The top surface 404 of upper element 104 includes a generally flat surface 530, having a generally circumferential upstanding wall extending upwardly therefrom, as seen particularly in FIG. 3A. The generally peripheral upstanding wall includes raised edge wall 476 extending along edge surface 420, a rear wall portion 532 extending along edge surface 406, a wall portion 534 extending along edge surface 420, a wall portion 536 extending along edge surface 426, a wall portion 538 extending along edge surfaces 436, 438 and 440, a notched wall portion 540 extending along edge surfaces 442, 444, 446, 448, 450, 520, 518, 516 and 514, a wall portion 542 extending along edge surfaces 512 and 510 and a wall portion 544 extending along forwardly-facing surface 460.

Reference is now made to FIGS. 4A, 4B and 4C, which are simplified first, second and third perspective view illustrations of card-operated shutter movement restricting switch 120.

As seen in FIGS. 4A-4C, the card-operated shutter movement restriction switch 120 is preferably a unitary element, injection molded of plastic. Switch 120 includes a bottom generally planar portion 600 through which extends axis of rotation 482 of the switch 120 relative to the base element 102 and the upper element 104 at protrusion 472 (FIG. 3B). Generally planar portion 600 also defines a trigger surface 602 which is engaged by a card inserted into card-receiving slot 106 (FIGS. 1A-1C). An underside surface of generally planar portion 600 preferably includes an annular bearing surface 603 which surrounds an aperture or recess 604 which rotatably accommodates protrusion 472.

Extending upwardly and slightly downwardly from generally planar portion 600 is a lower vertically extending portion 605. Extending to a side of lower vertically extending portion 605 is a spring seat 606 for mounting of one end of tension spring 126 (FIG. 1B) and a conductor retaining portion 608, which preferably retains therein a conductor, such as a magnet 610, whose position may be readily ascertained by sensing circuitry (not shown).

Extending upwardly and laterally from lower vertically extending portion 605 is an upper vertically extending portion 614 which terminates in a shutter movement blocking finger portion 616.

It is appreciated that the relative azimuthal orientations of the trigger surface 602 and the shutter movement blocking finger portion 616 are such that when the trigger surface 602 lies in an azimuthal orientation within the card-receiving slot 106, in the absence of card insertion, the shutter movement blocking finger portion 616 lies in a shutter movement blocking azimuthal position, preventing raising of the shutter 110.

When the card-operated shutter movement restricting switch 120 is rotated azimuthally about axis 482 by insertion of a payment card into card-receiving slot 106 to an azimuthal orientation wherein trigger surface 602 lies alongside the card-receiving slot 106, the shutter movement blocking finger portion 616 lies in a shutter movement non blocking azimuthal position, permitting raising of the shutter 110.

Figure 5B:
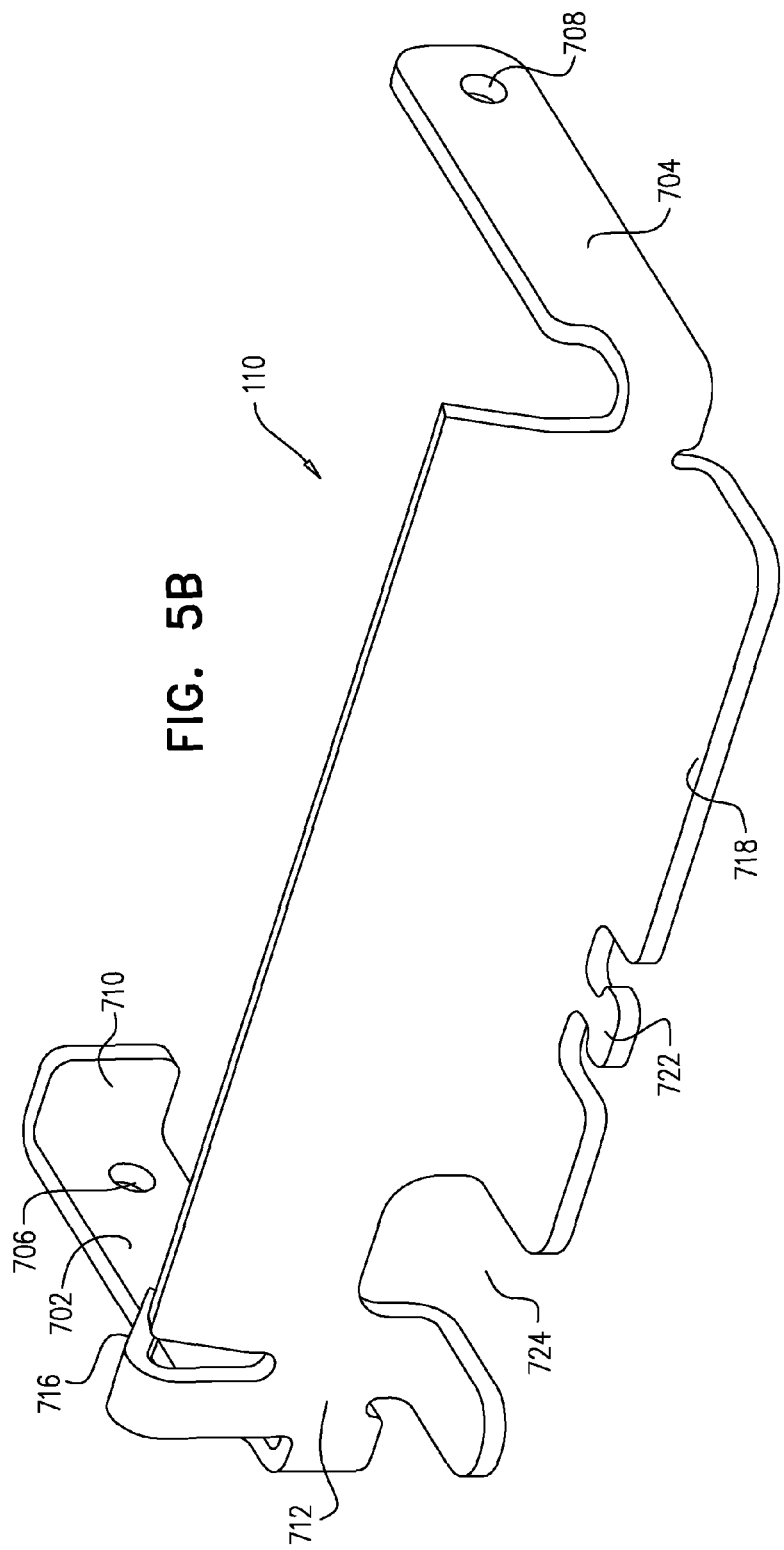
Figure 8A:
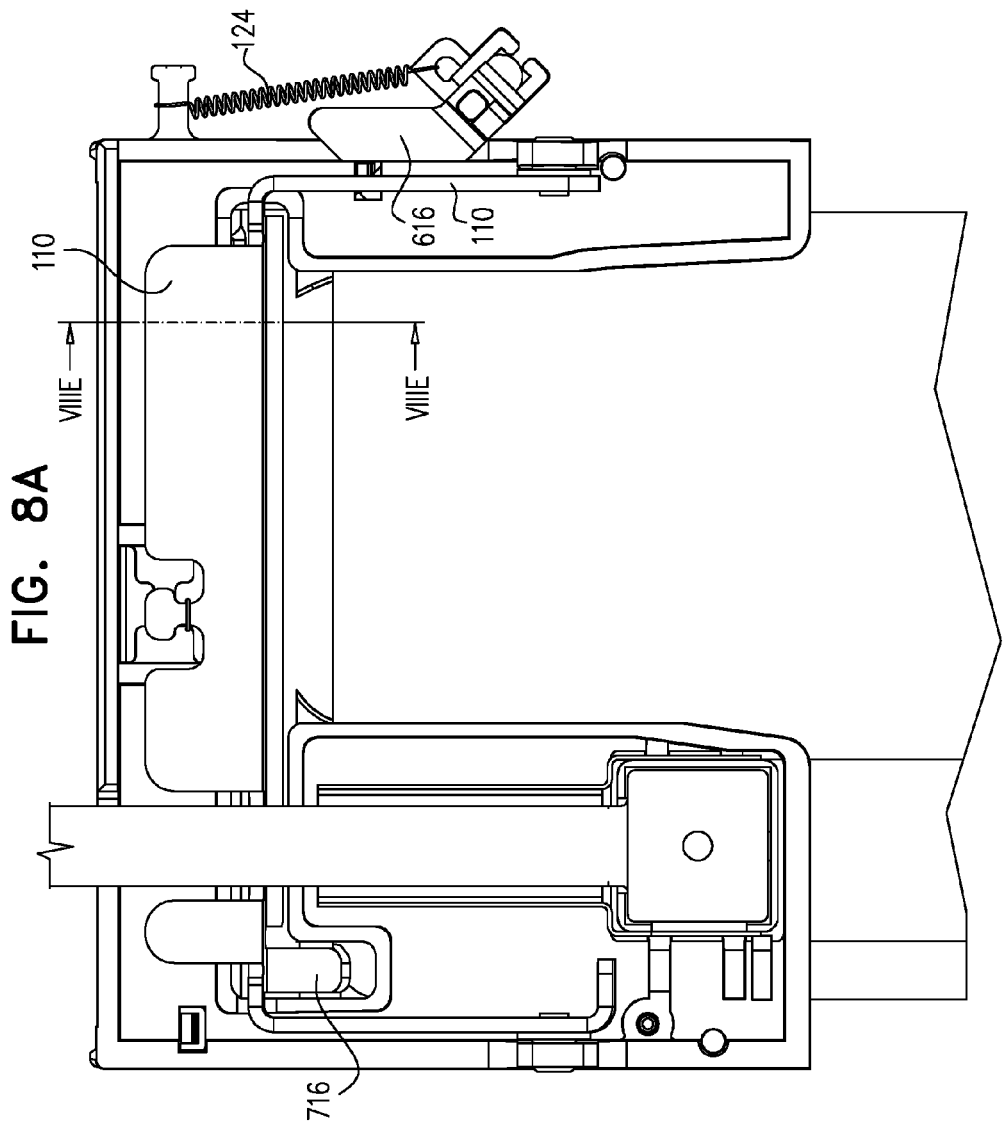
Figure 10B:
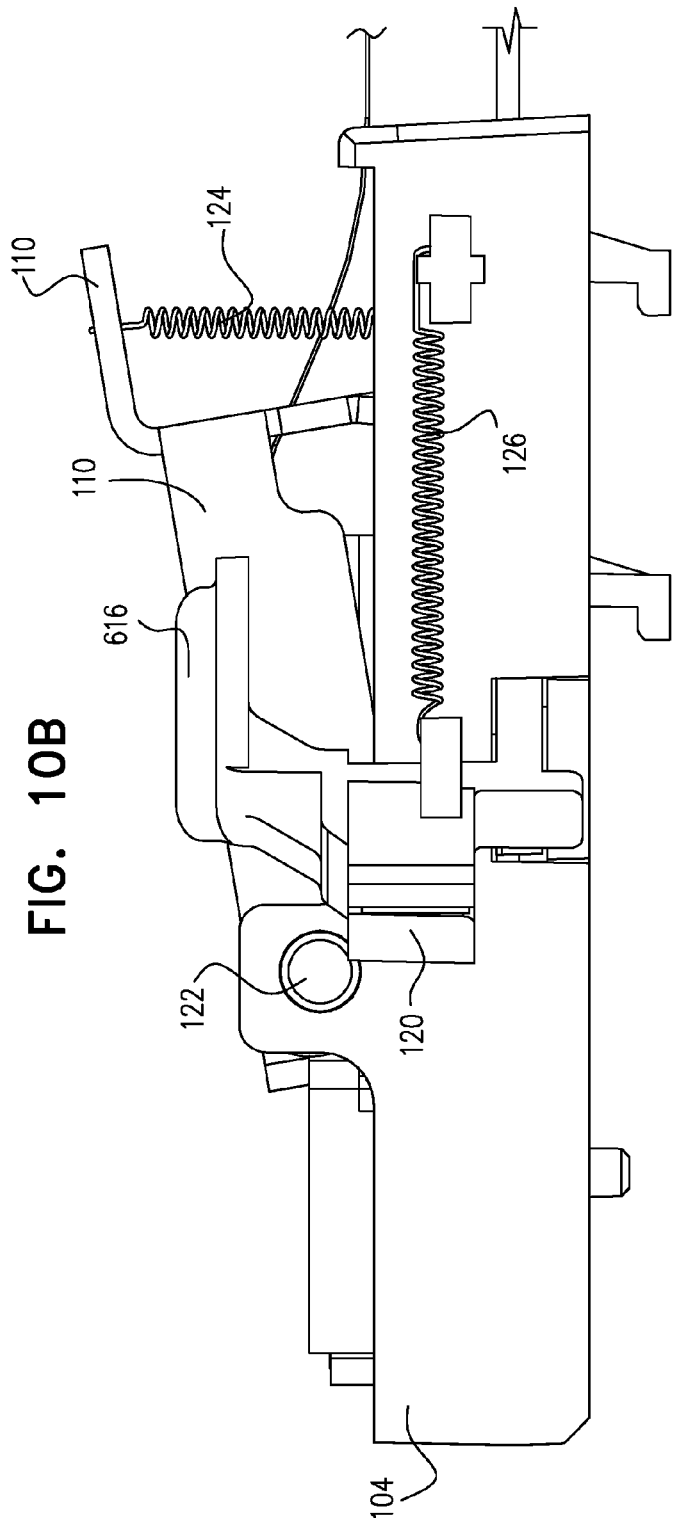

Reference is now made to FIGS. 5A and 5B, which are respective simplified first and second perspective view illustrations of card-operated shutter 110. Card operated shutter 110 is preferably a unitary element formed by punching and bending a flat element of metal.

As seen in FIGS. 5A and 5B, the card-operated shutter preferably comprises a pair of pivot arms 702 and 704 which lie in mutually parallel, mutually spaced orientation and have respective pivot pin receiving apertures 706 and 708. Arm 702 terminates forwardly in the sense of FIG. 5A, at a bent portion 710, having a bottom edge surface 711, which acts as a bottom stop surface limiting upward rotational displacement of the shutter.

Each of pivot arms 702 and 704 terminates at an opposite end of a main portion 712, which extends between and perpendicularly to arms 702 and 704. Extending below most of main portion 712 is a slightly forwardly bent portion 714. Extending below a portion of main portion 712 and lying between forwardly bent portion 714 and arm 702 is a forwardly bent hook portion 716.

Extending above and rearwardly of main portion 712, in the sense of FIG. 5A, and generally perpendicularly thereto, is a rearwardly-extending shelf portion 718 including a cut out portion 720 which defines a spring engagement protrusion 722. A cut out 724 is defined in shelf portion 718 and part of main portion 712.

Reference is now made to FIGS. 6A-10E, which are respective simplified top view, side view, back view, front view and sectional illustrations of the magnetic stripe card receiver of FIGS. 1A-5B in five sequential operative orientations.

As seen in FIGS. 6A-6E, when a card is not inserted in the magnetic stripe card receiver, card-operated shutter movement restricting switch 120 is in a card-receiving slot engaging rotational position by action of spring 126. In this operative orientation, bottom generally planar portion 600 extends into card-receiving slot 106 (FIGS. 1A-1C). In this operative orientation, shutter movement blocking finger portion 616 lies in a shutter movement blocking azimuthal position, preventing raising of the shutter 110.

As seen in FIGS. 7A-7E, when a card is partially inserted in the magnetic stripe card receiver and a corner edge 740 of the card engages trigger surface 602, this engagement causes shutter movement restricting switch 120 to slightly rotate in a direction indicated by an arrow 750 about axis of rotation 482 to a position wherein bottom generally planar portion 600 extends into card-receiving slot 106 to a lesser extent than in the operative orientation of FIGS. 6A-6E. In this second operative orientation, shutter movement blocking finger portion 616 still lies in a shutter movement blocking azimuthal position, preventing raising of the shutter 110.

As seen in FIGS. 8A-8E, when the card is further inserted in the magnetic stripe card receiver and a side edge 760 of the card engages trigger surface 602, this engagement causes shutter movement restricting switch 120 to further rotate in a direction indicated by arrow 750 about axis of rotation 482 to a position wherein bottom generally planar portion 600 no longer extends into card-receiving slot 106. In this third operative orientation, shutter movement blocking finger portion 616 no longer lies in a shutter movement blocking azimuthal position and thus no longer prevent raising of the shutter 110.

Additionally, in this operative orientation, it is seen that a forward edge 770 touches but does not yet displace forwardly bent hook portion 716 of card-operated shutter 110 and thus the card-operated shutter 110 is fully operative to prevent insertion of foreign sharp objects, such as flat head screwdrivers or knives, into card-receiving slot 106 from rear opening 108.

As seen in FIGS. 9A-9E, when the card is still further inserted in the magnetic stripe card receiver, side edge 760 of the card still engages trigger surface 602, retaining shutter movement blocking finger portion 616 outside of a shutter movement blocking azimuthal position, at which it does not prevent raising of the shutter 110.

Importantly, in this fourth operative orientation, it is seen that forward edge 770 partially displaces forwardly bent hook portion 716 of card-operated shutter 110 and causes card-operated shutter to rotate about an axis 780 to a partially raised position.

As seen in FIGS. 10A-10E, when the card is fully inserted in the magnetic stripe card receiver, side edge 760 of the card still engages trigger surface 602, retaining shutter movement blocking finger portion 616 outside of a shutter movement blocking azimuthal position, at which it does not prevent raising of the shutter 110.

Importantly, in this fifth operative orientation, it is seen that forward edge 770 fully displaces forwardly bent hook portion 716 of card-operated shutter 110 and causes card-operated shutter to rotate about an axis 780 to a fully raised position.

Accordingly it is appreciated that only upon full insertion of a card into the card-receiving slot 106 is the card-operated shutter 110 fully raised out of its protective operative orientation in which it prevents insertion of foreign sharp objects, such as flat head screwdrivers or knives, into card-receiving slot 106.

It will be appreciated by persons skilled in the art that the present invention is not limited by what has been particularly shown and described hereinabove and includes both combinations and sub-combinations of features described herein as well as modifications and variations thereof which are not in the prior art.

The invention claimed is:
1. A payment card receiver comprising:
   at least one element defining a payment card receiving slot;
   a shutter, pivotably mounted with respect to said payment card receiving slot for selectably blocking said payment card receiving slot, said shutter having a lower portion that extends beyond a lower extent of said card receiving slot; and
   a card-operated shutter movement restricting switch operative to retain said shutter in a blocking orientation of said payment card receiving slot in the absence of at least partial insertion of a payment card in said payment card receiving slot.
2. The payment card receiver according to claim 1, said card-operated shutter movement restricting switch comprising a unitary element comprising a generally planar portion defining a trigger portion configured to be engaged by said payment card when inserted to at least a predetermined extent into said payment card receiving slot.

3. The payment card receiver according to claim 2, said generally planar portion further comprising an annular bearing surface surrounding an aperture configured to accommodate a protrusion that defines an axis of rotation for said card-operated shutter movement restricting switch.

4. The payment card receiver according to claim 3, wherein said card-operated shutter movement restricting switch is rotatable relative to said at least one element about said axis of rotation from said blocking orientation to a non-blocking orientation of said payment card receiving slot.

5. The payment card receiver according to claim 3, wherein said card-operated shutter movement restricting switch is spring loaded to normally be in said blocking orientation in the absence of engagement therewith by said payment card in said payment card receiving slot.

6. The payment card receiver according to claim 2, wherein said trigger portion is configured to be rotated by insertion of said payment card into engagement with said trigger portion in said payment card receiving slot.

7. The payment card receiver according to claim 6, wherein rotation of said trigger portion produces rotation of said shutter movement restricting switch from said blocking orientation to said non-blocking orientation.

8. The payment card receiver according to claim 1, wherein said card-operated shutter movement restricting switch is spring loaded to normally be in said blocking orientation in the absence of engagement therewith by said payment card in said payment card receiving slot.

9. The payment card receiver according to claim 2, wherein said card-operated shutter movement restricting switch is spring loaded to normally be in said blocking orientation in the absence of engagement therewith by said payment card in said payment card receiving slot.

10. The payment card receiver according to claim 1, wherein said shutter comprises a unitary element.

11. The payment card receiver according to claim 1, wherein said card-operated shutter movement restricting switch includes a sensible element whose position can be electronically sensed to provide an indication of its operative orientation.

12. The payment card receiver according to claim 1, wherein said card-operated shutter movement restricting switch includes a conductor whose position can be electronically sensed to provide an indication of its operative orientation.

13. A payment card receiver comprising:
at least one element defining a payment card receiving slot;
a shutter, comprising a unitary element and pivotably mounted with respect to said payment card receiving slot for selectably blocking said payment card receiving slot, said shutter being formed by punching and bending a flat element of metal; and
a card-operated shutter movement restricting switch operative to retain said shutter in a blocking orientation of said payment card receiving slot in the absence of at least partial insertion of a payment card in said payment card receiving slot.

14. A payment card receiver comprising:
at least one element defining a payment card receiving slot;
a shutter, comprising a unitary element and pivotably mounted with respect to said payment card receiving slot for selectably blocking said payment card receiving slot, said shutter further comprising a forwardly bent hook portion that is configured to be engaged by a forward edge of said payment card upon insertion in said card receiving slot to at least a predetermined extent; and
a card-operated shutter movement restricting switch operative to retain said shutter in a blocking orientation of said payment card receiving slot in the absence of at least partial insertion of a payment card in said payment card receiving slot.

15. The payment card receiver according to claim 14, wherein, when engaged by said forward edge of said payment card, said forward edge at least partially displaces said forwardly bent hook portion causing said shutter to rotate about an axis to at least a partially raised position.

16. The payment card receiver according to claim 14, wherein said forwardly bend hook portion extends beyond a lower extent of said card receiving slot.

* * * * *